US010305547B2

(12) United States Patent
Suzuki et al.

(10) Patent No.: US 10,305,547 B2
(45) Date of Patent: *May 28, 2019

(54) COMMUNICATION DEVICE, CONTROL METHOD, PROGRAM, AND FRONT END

(71) Applicant: FeliCa Networks, Inc., Tokyo (JP)

(72) Inventors: Takashi Suzuki, Kanagawa (JP); Norihiro Ichimaru, Kanagawa (JP); Katsuyuki Teruyama, Tokyo (JP)

(73) Assignee: FeliCa Networks, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,020

(22) Filed: Jul. 26, 2016

(65) Prior Publication Data

US 2016/0337002 A1    Nov. 17, 2016

Related U.S. Application Data

(63) Continuation of application No. 14/955,582, filed on Dec. 1, 2015, now Pat. No. 9,444,519, which is a (Continued)

(30) Foreign Application Priority Data

Mar. 7, 2012    (JP) ................. 2012-050016

(51) Int. Cl.
*H04B 5/00*    (2006.01)
*G06Q 20/32*    (2012.01)
(Continued)

(52) U.S. Cl.
CPC ....... *H04B 5/0031* (2013.01); *G06Q 20/3278* (2013.01); *H04L 67/104* (2013.01);
(Continued)

(58) Field of Classification Search
CPC ..... H04W 4/005; H04W 4/008; H04W 76/14; H04W 4/80; H04W 72/10; H04W 4/60;
(Continued)

(56) References Cited

U.S. PATENT DOCUMENTS 8,073,488 B2    12/2011  Yoneda
8,331,988 B2    12/2012  Yoneda
(Continued)

FOREIGN PATENT DOCUMENTS

JP    2005-223722 A    8/2005
JP    2008022533 A     1/2008
(Continued)

OTHER PUBLICATIONS

Extended European Search Report for EP Application No. 13758604.6, dated Oct. 23, 2015.
(Continued)

*Primary Examiner* — Eugene Yun
(74) *Attorney, Agent, or Firm* — Lerner, David, Littenberg, Krumholz & Mentlik, LLP

(57)    ABSTRACT

The present technology relates to a communication device, a control method, and a program which enable reliable selection of a desired target. A CLF transmits a polling command received from a NFC reader for selecting a candidate of a final target to targets, selects the candidate of the final target, by setting a P2P application as a target having the highest priority in the selection of the candidate of the final target, selects the final target based on a command other than the polling command received from the NFC reader, and controls to lower the priority of the P2P application, in a case where the P2P application is selected as the candidate of the final target and the P2P application is
(Continued)

not selected as the final target. The present technology can be applied to a communication device supporting an NFC standard, for example.

16 Claims, 23 Drawing Sheets

Related U.S. Application Data continuation of application No. 14/382,070, filed as application No. PCT/JP2013/054671 on Feb. 25, 2013, now Pat. No. 9,237,409.

(51) Int. Cl.
| | |
|---|---|
| *H04L 29/08* | (2006.01) |
| *H04W 72/10* | (2009.01) |
| *H04W 4/80* | (2018.01) |
| *H04W 76/14* | (2018.01) |
| *H04W 4/60* | (2018.01) |

(52) U.S. Cl.
CPC ............. *H04W 4/80* (2018.02); *H04W 72/10* (2013.01); *H04W 76/14* (2018.02); *H04M 2250/04* (2013.01); *H04W 4/60* (2018.02)

(58) Field of Classification Search
CPC .............. G06Q 20/3278; H04B 5/0031; H04L 67/104; H04M 2250/04
USPC ...................................... 455/41.1
See application file for complete search history.

(56) References Cited

U.S. PATENT DOCUMENTS

| | | | |
|---|---|---|---|
| 8,457,024 B2 | 6/2013 | Teruyama | |
| 8,744,348 B2 | 6/2014 | Fine et al. | |
| 9,237,409 B2* | 1/2016 | Suzuki | G06Q 20/3278 |
| 2009/0037326 A1 | 2/2009 | Chitti et al. | |
| 2011/0279854 A1 | 11/2011 | Ido | |
| 2011/0282989 A1 | 11/2011 | Geirhofer et al. | |
| 2012/0032789 A1 | 2/2012 | Ichimaru et al. | |
| 2012/0178366 A1* | 7/2012 | Levy | G06K 7/10237 |
| | | | 455/41.1 |
| 2012/0215851 A1 | 8/2012 | Wu et al. | |
| 2012/0309302 A1* | 12/2012 | Buhot | H04B 5/00 |
| | | | 455/41.1 |
| 2013/0078905 A1 | 3/2013 | Yoneda | |
| 2014/0274143 A1* | 9/2014 | Trantow | H04W 4/023 |
| | | | 455/456.3 |

FOREIGN PATENT DOCUMENTS

| | | |
|---|---|---|
| JP | 2009-128942 A | 6/2009 |
| JP | 2011-049778 A | 3/2011 |
| JP | 2011-229412 A | 12/2011 |
| JP | 2012039257 A | 2/2012 |
| WO | 2010-115770 A1 | 10/2010 |

OTHER PUBLICATIONS

International Preliminary Report on Patentability from International Application No. PCT/JP2013/054671, dated Jun. 20, 2014.
International Search Report from International Publication PCT/JP2013/054671 dated Apr. 23, 2013.
Japanese Office Action for Applicaton No. JP2014503767 dated Nov. 29, 2016.
Extended European Search Report for Application No. EP17187515.6 dated Oct. 10, 2017.
Japanese Office Action for JP Application No. 2017117860, dated Sep. 27, 2018.
Japanese Office Action for JP Application No. 2017117860, dated Apr. 10, 2018.

* cited by examiner

FIG. 2

Table 1 LIST OF Polling parameter AND RESPONSE CONDITIONS

| SC | RC | TSN | ESE | UICC | P2P | remark |
|---|---|---|---|---|---|---|
| FFFF | 0 | 0 | ○ | ○ | ○ | |
| other | 0 | 0 | ○ | ○ | × | |
| FFFF | 0 | 1 | ○ | ○ | ○ | |
| other | 0 | 1 | ○ | ○ | × | |
| FFFF | 0 | 3/7/F | ○ | ○ | ○ | Forum technology detection |
| other | 0 | 3/7/F | ○ | ○ | × | |
| FFFF | 1 | 0 | ○ | ○ | ○ | |
| other | 1 | 0 | ○ | ○ | × | |
| FFFF | 1 | 1 | ○ | ○ | ○ | |
| other | 1 | 1 | ○ | ○ | × | |
| FFFF | 1 | 3/7/F | ○ | ○ | ○ | |
| other | 1 | 3/7/F | ○ | ○ | × | |
| FFFF | 2 | 0 | ○ | ○ | ○ | |
| other | 2 | 0 | ○ | ○ | × | |
| FFFF | 2 | 1 | ○ | ○ | ○ | |
| other | 2 | 1 | ○ | ○ | × | |
| FFFF | 2 | 3/7/F | ○ | ○ | ○ | |
| other | 2 | 3/7/F | ○ | ○ | × | |
| FFFF | other | 0 | ○ | ○ | ○ | CONDITIONS IN SHADED PARTS ARE CONDITIONS IN WHICH THE RESPONSES CAN NOT BE RETURNED AT ONCE DUE TO INSUFFICIENT NUMBER OF slots, EVEN WHEN CLF HAS MULTIPLE RESPONSE FUNCTION |
| other | other | 0 | ○ | ○ | × | |
| FFFF | other | 1 | ○ | ○ | ○ | |
| other | other | 1 | ○ | ○ | × | |
| FFFF | other | 3/7/F | ○ | ○ | ○ | |
| other | other | 3/7/F | ○ | ○ | × | |

Polling Parameter
SC = System Code
RC = Request Code
TSN = Time Slot Number

FIG. 18

| SoD | | Payload | | | Data |
|---|---|---|---|---|---|
| LEN | Byte 1 | Byte 2 | ... | Byte n | EoD |
| | | | | | CRC_F1 | CRC_F2 |

Table 42: SENSF_RES Format

| Byte 1 | Byte 2~9 | Byte 10~11 | Byte 12~14 | Byte 15 | Byte 16 | Byte 17 | [Byte 18~19] |
|---|---|---|---|---|---|---|---|
| 01h | NFCID2 | PAD0 | PAD1 | MRTI_CHECK | MRTI_UPDATE | PAD2 | [RD] |

SENSF_RES format & position of NFCID2

COMMUNICATION DEVICE, CONTROL METHOD, PROGRAM, AND FRONT END

CROSS-REFERENCE TO RELATED APPLICATIONS

The present application is a continuation of U.S. application Ser. No. 14/955,582, filed Dec. 1, 2015 which is a continuation of U.S. application Ser. No. 14/382,070, filed Aug. 29, 2014, which is a National Phase entry under 35 U.S.C § 371 of International Application No. PCT/JP2013/054671, filed on Feb. 25, 2013, published on Sep. 12, 2013 as WO 2013/133058 A1, which claims priority from Japan Patent Application No. 2012-050016, filed on Mar. 7, 2012, the disclosures of which are incorporated herein by reference.

TECHNICAL FIELD

The present technology relates to a communication device, a control method, a program, and a front end, and particularly relates to a communication device, a control method, a program, and a front end which enable reliable selection of a desired target.

BACKGROUND ART

As a standard of wireless communication, near field communication (NFC) has been known. In an NFC device supporting the NFC standard, a case in which a plurality of communication targets (hereinafter, referred to as targets) simultaneously exist in a terminal is assumed.

As the NFC device, an NFC device including a plurality of secure elements as targets, and a front end which is shared by the secure elements and performs near field communication with an external device such as a reader, has been proposed, in which the front end allocates different time slots for communication with respect to the plurality of secure elements at the time of the operation (for example, see PTL 1).

As shown in FIG. 1, there are two systems of a single response system and a multi response system, used for performing near field communication between a contactless front end (CLF) (hereinafter, also referred to as a front end) for performing wireless communication for NFC and a reader.

In the single response system, the front end replies with one polling response according to a polling from a reader side, and therefore the reader performs a process with respect to a target corresponding to the polling response. Accordingly, in the single response system, it is advantageous that the system can be employed without providing a particular circuit, but, validity of the target (which indicates a "possibility of a response to the reader, regarding a response from the target desired by the reader") may be degraded, compared to the multi response system.

Meanwhile, in the multi response system, the front end replies with a plurality of polling responses according to a polling from a reader side, and therefore the reader performs a process with respect to a target corresponding to a desired polling response selected from the plurality of polling responses, as long as it supports a reception of the plurality of responses. Accordingly, in the multi response system, it is necessary to provide a particular circuit for replying with a plurality of responses at once in the front end and a mounted surface becomes complicated, but it is possible to increase the validity of the target, compared to the single response system.

SUMMARY OF INVENTION

Technical Problem

However, as shown in FIG. 2, even in a case where the front end has a function of the multi response system, if there are only two time slots, when it is desired to reply with three polling responses, for example, it is difficult to reply with three polling responses at once due to an insufficient number of slots. As described above, in the multi response system, if the number of slots is great, the replying can be performed for all of polling slots, but when the reader polls with a small time slot number (TSN) such as 0 or 1, all of the polling responses may not be replied due to the insufficient number of slots. In addition, there are a program to be executed with communication in the single response system such as an application program for electronic money, and a program for which the multi response system is difficult to use due to mounting restrictions of the reader, among the application programs.

In addition, in order to use the multi response system, it is necessary to provide a particular circuit in the front end, and therefore it is necessary to mount a particular circuit in a case of using an existing device not supporting the multi response system.

Further, it may be difficult to determine which response of target to be replied at the front end, depending on a command transmitted from the reader, and in this case, it is difficult to select the target desired by the reader.

The technology is made in consideration of these circumstances and an object thereof is to support behavioral specifications of the reader described above, and reliably select the target desired by the reader without mounting the particular circuit in the front end.

Solution to Problem

According to one aspect of the present technology, there is provided a communication device including: a plurality of targets which execute a predetermined process, respectively; and a front end which selects a final target to be a communication target of an external device from the plurality of targets and performs near field communication with the external device, in which the plurality of targets include an application of P2P (Peer to Peer), and the front end transmits a first command which is received from the external device for selecting a candidate of the final target, to the plurality of targets, selects the candidate of the final target by setting the application of P2P as a target having the highest priority in the selection of the candidate of the final target, selects the candidate of the final target as the final target, based on a second command which is received from the external device and includes identification information of a predetermined target, and lowers the priority of the application of P2P in the selection of the candidate of the final target, in a case where the application of P2P is selected as the candidate of the final target and the application of P2P is not selected as the final target.

The front end performs the broadcast transmission of the first command to the plurality of targets, in a case where the first command is received from the external device.

The other targets excluding the application of P2P among the plurality of targets, include at least any one or both of a secure element and a universal integrated circuit card (UICC), and the front end changes the priority of the application of P2P to the next place of the priority of any one or both of the secure element and the UICC.

The front end changes the priority so that a higher priority is assigned in the order of the secure element, the UICC, and the application of P2P.

The front end changes priority so that a higher priority is assigned in the order of the secure element, the application of P2P, and the UICC.

The other targets further include a predetermined application based on a predetermined standard, and the front end changes the priority so that a higher priority is assigned in the order of the secure element, the UICC, the predetermined application, and the application of P2P.

The front end changes the priority of the application of P2P to be the lowest priority.

The front end changes the priority according to an operation sequence of the external device.

In a case where the priority of the application of P2P is changed and a predetermined period of time which is set in advance has elapsed, the front end returns the priority of the application of P2P to be the highest priority.

The front end deselects the final target from the communication target of the external device, based on predetermined target deselecting conditions.

In a case where the broadcast transmission of the first command is performed to the plurality of targets and a response is replied from any target, the front end deselects the final target from the communication target of the external device.

The front end selects the candidate of the final target as the final target, when the identification information included in the second command and identification information of the candidate of the final target coincide with each other.

A control method and a program according to one aspect of the present technology are a control method and a program for the communication device according to one aspect of the present technology. In addition, a front end according to one aspect of the present technology includes a plurality of wired interfaces connected to a plurality of targets, transmits a first command which is received from the external device for selecting a candidate of the final target, to the plurality of targets through the wired interfaces, selects the candidate of the final target by setting the application of P2P as a target having the highest priority in the selection of the candidate of the final target, selects the candidate of the final target as the final target, based on a second command which is received from the external device and includes identification information of a predetermined target, controls to lower the priority of the application of P2P in the selection of the candidate of the final target, in a case where the application of P2P is selected as the candidate of the final target and the application of P2P is not selected as the final target, and selects the final target to be the communication target of the external device from the plurality of targets connected by the wired interfaces.

In the communication device, the control method, and the program according to one aspect of the present technology, a final target to be a communication target of an external device is selected from the plurality of targets each of which executes a predetermined process, and near field communication with the external device is performed. In addition, the first command which is received from the external device for selecting a candidate of the final target is transmitted to the plurality of targets, the candidate of the final target is selected by setting the application of P2P as a target having the highest priority in the selection of the candidate of the final target, the candidate of the final target is selected as the final target, based on a second command which is received from the external device and includes identification information of a predetermined target, and the priority of the application of P2P in the selection of the candidate of the final target is lowered, in a case where the application of P2P is selected as the candidate of the final target and the application of P2P is not selected as the final target. In addition, in the front end according to one aspect of the present technology, a first command which is received from the external device for selecting a candidate of the final target, is transmitted to the plurality of targets through the wired interfaces, the candidate of the final target are selected by setting the application of P2P as a target having the highest priority in the selection of the candidate of the final target, the candidate of the final target is selected as the final target, based on a second command which is received from the external device and includes identification information of a predetermined target, the priority of the application of P2P in the selection of the candidate of the final target is lowered, in a case where the application of P2P is selected as the candidate of the final target and the application of P2P is not selected as the final target, and the final target to be the communication target of the external device is selected from the plurality of targets connected by the wired interfaces.

Advantageous Effects of Invention

According to one aspect of the present technology, it is possible to perform reliable selection of the desired target.

BRIEF DESCRIPTION OF DRAWINGS

FIG. 2 is a diagram showing an example of response conditions in a multi response system.

FIG. 18 is a diagram showing a storage position of NFCID2 in a packet of a SENSF_RES command.

DESCRIPTION OF EMBODIMENTS

Hereinafter, embodiments of the present technology will be described with reference to the drawings.

[Configuration Example of NFC Device]

Figure 1:
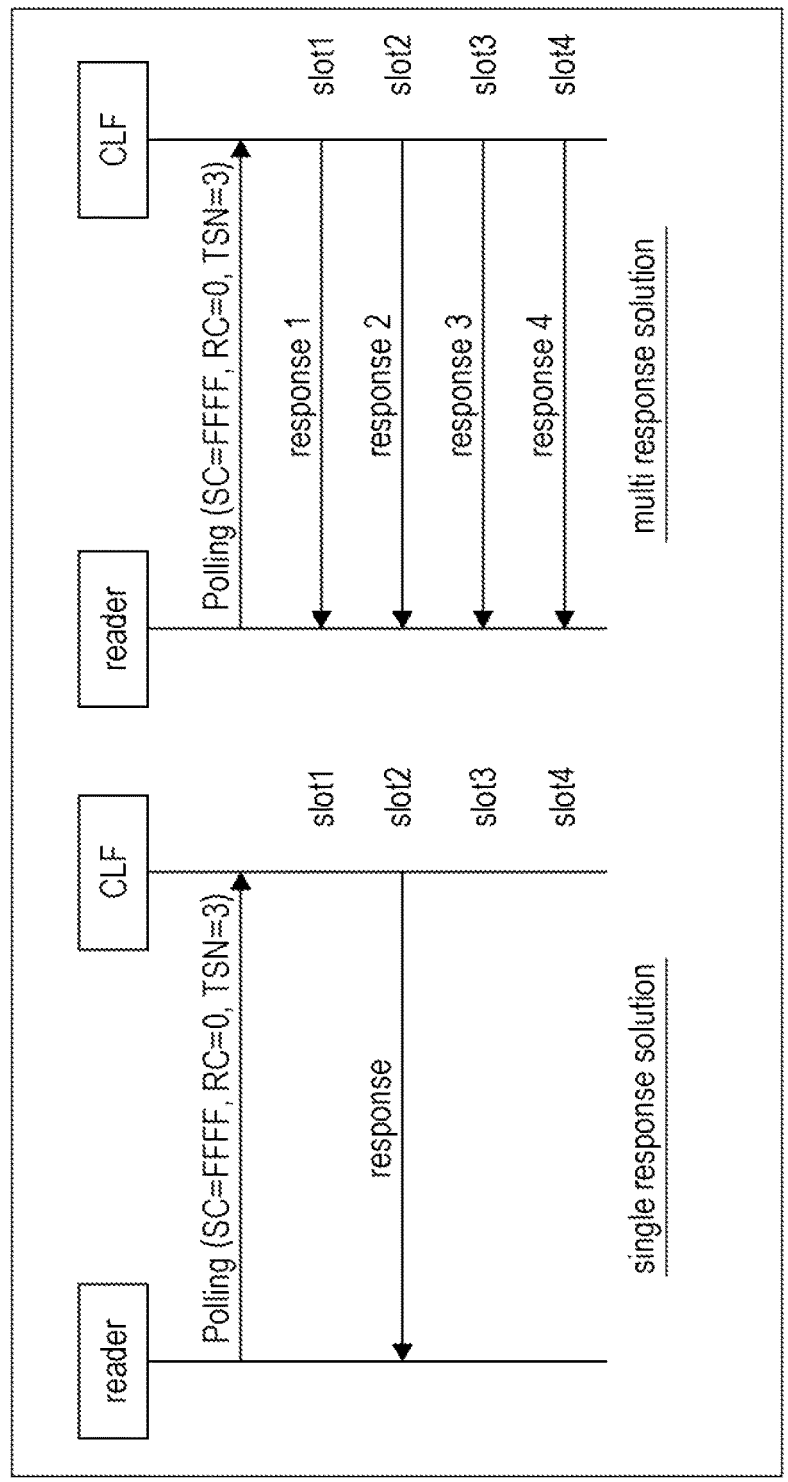
FIG. 1 is a diagram illustrating a system of near field communication.
Figure 3:
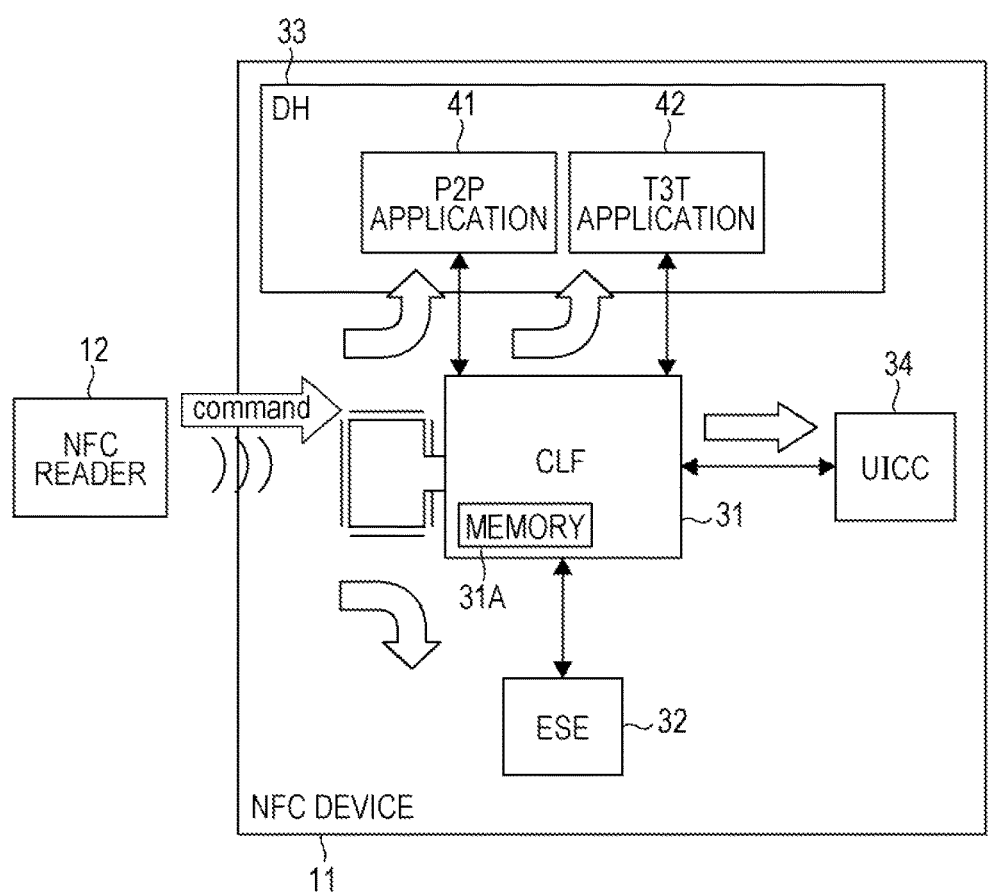
FIG. 3 is a diagram showing a configuration example of an NFC device.

FIG. 3 is a diagram showing a configuration example of an NFC device.

An NFC device 11 is, for example, configured as a device such as a mobile phone, an IC card, a personal digital assistant, or a personal computer. The NFC device performs near field communication with an external device such as an NFC reader 12 at a distance within tens of centimeters (including contacted state), by using a carrier wave of a frequency of 13.56 MHz in an industry science medical band (ISM), for example.

The NFC device 11 is configured with a CLF 31, an ESE 32, a DH 33, and a UICC 34. The CLF 31 and each of the ESE 32, the DH 33, and the UICC 34 as targets are connected to each other with wired interfaces to communicate with each other.

The contactless front end (CLF) 31 is connected to an antenna provided in the NFC device 11 and performs near field communication with the NFC reader 12. The CLF 31 is controlled to select a target desired by the NFC reader 12 according to a command transmitted from the NFC reader 12 so that communication between the target and the NFC reader 12 is performed.

In addition, the CLF 31 includes a memory 31A embedded therein, and stores various data items in the memory 31A, if necessary.

The embedded secure element (ESE) 32 is a secure element which is a core part including security of an IC chip, and realizes a security function in an NFC application, for example, electronic payment, an electronic train ticket, or an access control system.

The device host (DH) 33 controls an operation of each unit of the NFC device 11. In addition, the DH 33 executes a P2P application 41 or a T3T application 42. The P2P application 41 is an application program of peer to peer (P2P). In addition, the T3T application 42 is an application program for emulation of Type 3 Tag (T3T) regulated by the NFC standard. One or a plurality of the P2P application 41 and the T3T application 42 can be executed.

The universal integrated circuit card (UICC) 34 is, for example, configured with a subscriber identity module (SIM) card. The UICC 34, for example, realizes an electronic payment function by executing the NFC application program.

As described above, the ESE 32, the UICC 34, the P2P application 41, and the T3T application 42 are targets as communication targets of the NFC reader 12 and perform a predetermined process, respectively. That is, the targets include devices such as the ESE 32 and the UICC 34 and application programs such as the P2P application 41 and the T3T application 42. However, the targets may include application programs executed in the ESE 32 and the UICC 34. The NFC device 11 is configured as described above.

[Specific Configuration Example of CLF]

Figure 4:
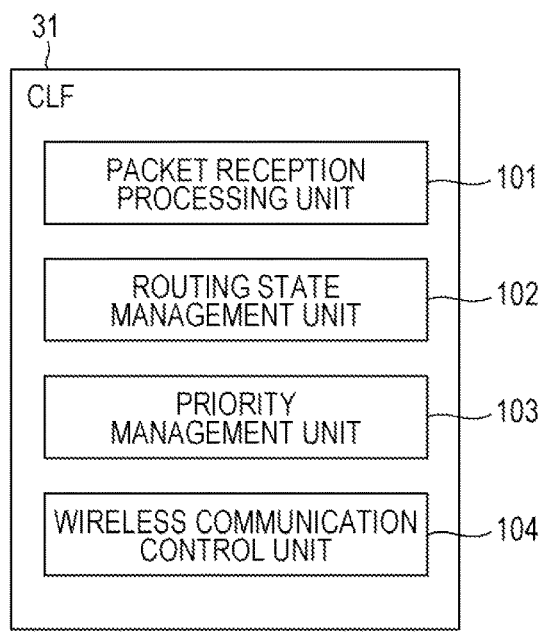
FIG. 4 is a diagram showing a specific configuration example of a CLF.

FIG. 4 is a diagram showing a specific configuration example of the CLF 31 of FIG. 3.

The CLF 31 is configured with a packet reception processing unit 101, a routing state management unit 102, a priority management unit 103, and a wireless communication control unit 104.

The packet reception processing unit 101 performs a process relating to a received packet which is transmitted from the NFC reader 12.

The routing state management unit 102 manages state transition of routing performed in the CLF 31. The routing state includes a neutral state and a selected state which will be described later.

The priority management unit 103 manages a priority of a response from the target with respect to a polling command. In addition, information relating to the priority is held in the memory 31A and is suitably read out, if necessary.

The wireless communication control unit 104 performs a process for controlling near field communication performed between the CLF and the NFC reader 12.

The CLF 31 is configured as described above.

[Outline of Routing Performed by CLF]

Next, an outline of routing performed by the CLF 31 will be described. The routing performed by the CLF 31 is realized by a state machine of routing and a process on the received packet in each state.

[State Machine of Routing]

Figure 5:
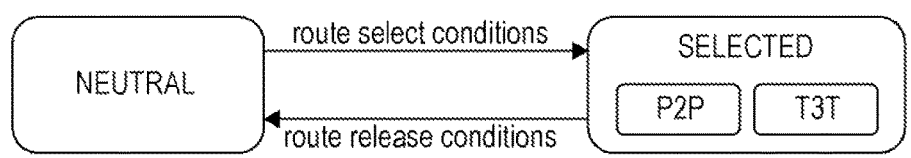
FIG. 5 is a diagram showing an outline of a state machine of routing.

As shown in FIG. 5, the state machine is configured with two states of a neutral state (NEUTRAL) and a selected state (SELECTED). The neutral state indicates a state where a target has not been decided, and the selected state indicates a state where a target has been decided.

In the neutral state, analysis of the received packet from the NFC reader 12 is performed, and a process for deciding a target is performed according to the analyzed result. When a target is decided, the routing state transitions to the selected state from the neutral state.

In the selected state, the received packet is automatically allocated to a final target decided in the neutral state. In addition, there are a P2P selected state (P2P SELECTED) and a T3T selected state (T3T SELECTED) as the selected state, according to a protocol. The P2P selected state indicates a state where the P2P application 41 has been selected. The T3T selected state indicates a state where the ESE 32, the UICC 34, or the T3T application 42 other than the P2P application 41 has been selected. In addition, when the final target is deselected due to generated predetermined deselecting conditions, the routing state transitions to the neutral state from the selected state.

The final target is decided by the CLF 31 as a single communication target with the NFC reader 12 from the targets existing in the NFC device 11, based on predetermined checking conditions with respect to input information such as a command code stored in the received packet from the NFC reader 12 or a protocol of the received packet. The CLF 31 allocates the received packet to the selected final target, until the final target is deselected or the final target is changed.

Figure 6:
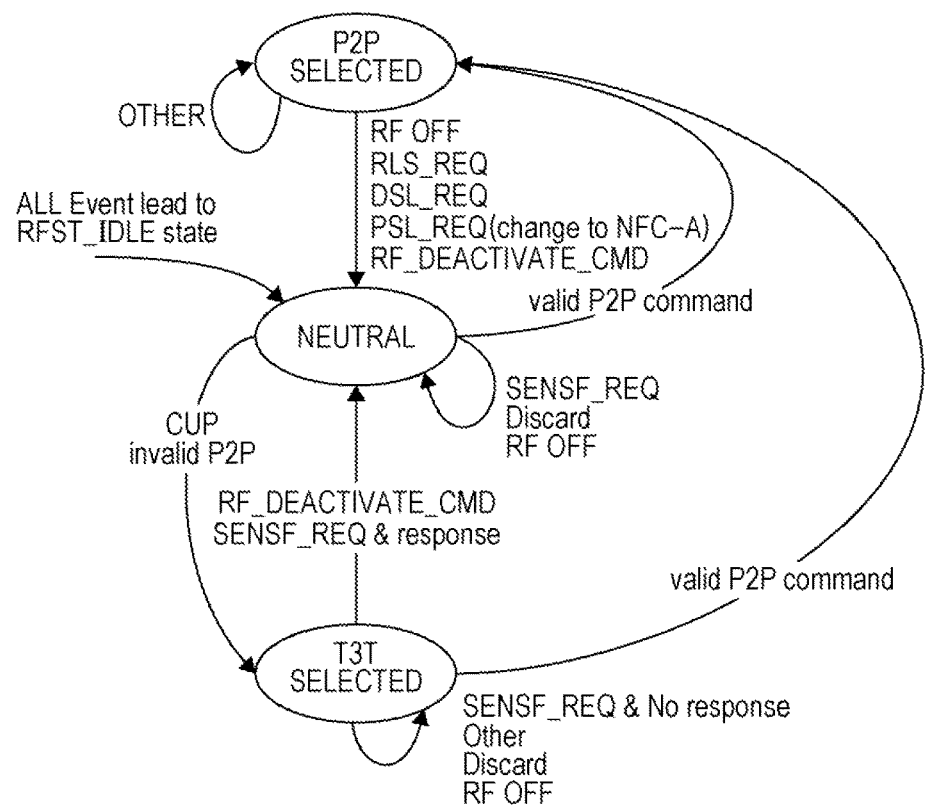
FIG. 6 is a diagram showing a state transition of a state machine of routing.

FIG. 6 is a diagram showing a state transition of the state machine of routing.

In FIG. 6, when the P2P application 41 is selected as the final target in the neutral state, the routing state transitions to the P2P selected state from the neutral state. In addition, when the T3T application 42 or the like is selected as the final target in the neutral state, the routing state transitions to the T3T selected state from the neutral state. Further, when a SENSF_REQ command is received, or a radio frequency (RF) signal is turned off, the routing state stays in the neutral state.

In the P2P selected state, when the RF signal is turned off or when a RLS_REQ command, a DSL_REQ command, a PSL_REQ command accompanied with a technology change to a NFC-A, or a RF_DEACTIVATE_CMD command is received, the routing state transitions to the neutral state from the P2P selected state. In addition, when a command other than the command described above is received in the P2P selected state, the routing state stays in the P2P selected state. Further, the RLS_REQ command and the DSL_REQ command are commands for instructing completion of transaction of the P2P communication. The PSL_REQ command is a command for instructing a change of the communication state of the P2P communication. In addition, the RF_DEACTIVATE_CMD command is a command for instructing completion based on a predetermined standard.

In the T3T selected state, when the RF_DEACTIVATE_CMD command is received or when the broadcast transmission of the SENSF_REQ command is performed to each target and then the response thereof is replied, the routing state transitions to the neutral state from the T3T selected state. In addition, in the T3T selected state, when the response with respect to the SENSF_REQ command is not replied or when the RF signal is turned off, the routing state stays in the T3T selected state. Further, in the T3T selected state, when the valid P2P command is received, the routing state transitions to the P2P selected state from the T3T selected state.

As described above, the CLF 31 transitions to any routing state of the neutral state, the P2P selected state, and the T3T selected state, and performs a process on the received packet according to the state thereof.

[Process on Received Packet]

The process on the received packet is classified into a process when a polling command is received, and a process when a command other than the polling command is received.

(Process when Polling Command is Received)

Figure 7:
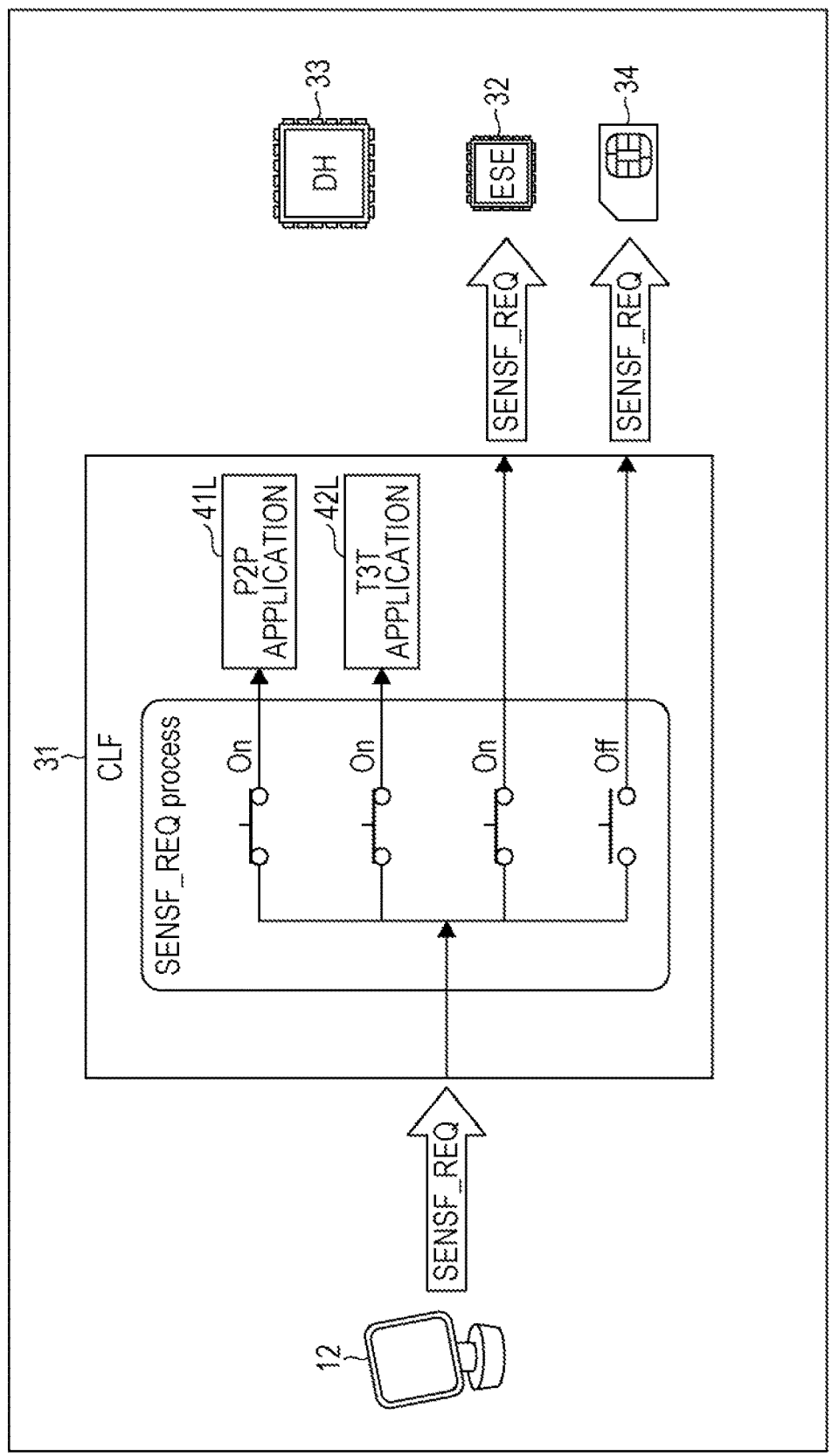
FIG. 7 is a diagram showing a process when a polling command is received.

FIG. 7 is a diagram showing a process when the polling command is received.

When the SENSF_REQ command is received from the NFC reader 12, the broadcast transmission of the command is performed to the plurality of targets by the CLF 31.

That is, identification information for specifying the target is not included in the packet storing the SENSF_REQ command, and accordingly it is difficult to use the command in the process for specifying the target. Accordingly, the broadcast transmission of the SENSF_REQ command as a polling command is performed by the CLF 31 for searching a candidate to be a target. That is, for the NFC reader 12, the SENSF_REQ command is a command for searching a candidate of the final target and acquiring information relating to the target.

In addition, as the identification information of the target, NFCID2 capable of uniquely identifying the target is used, for example.

In addition, the SENSF_REQ command with respect to the P2P application 41 and the T3T application 42 is not transmitted to the DH 33 and is subjected to the process in the CLF 31. Hereinafter, such a target to which the SENSF_REQ command is practically not transmitted is referred to as a logical target, and a target to which the SENSF_REQ command is practically transmitted, for example, ESE 32 or the UICC 34 is referred to as a physical target. However, when it is not necessary to differentiate the logical target and the physical target, it is simply referred to as a target. In the embodiment, the SENSF_REQ command will be described as a command subjected to the broadcast transmission not only to the physical target, but also to the logical target.

Figure 8:
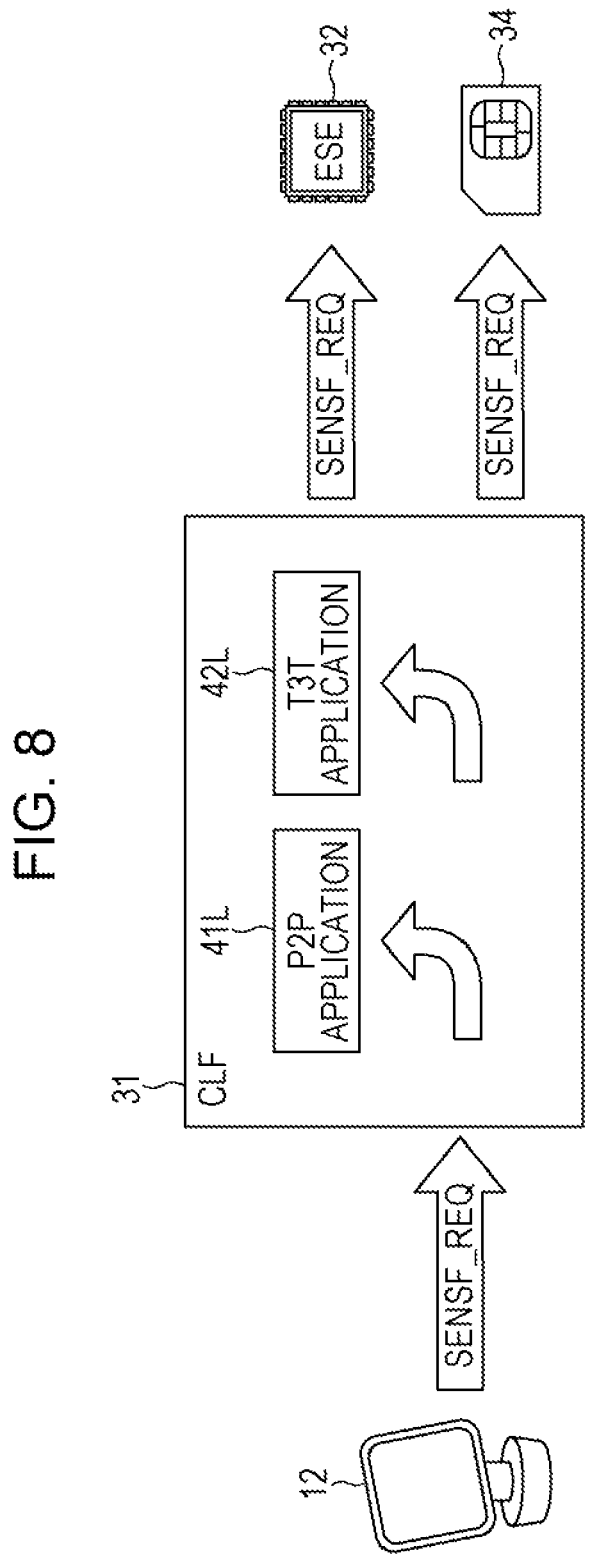
FIG. 8 is a diagram showing a process of a SENSF_REQ command.

More specifically, as shown in FIG. 8, when the SENSF_REQ command is received from the NFC reader 12, the CLF 31 performs the broadcast transmission of the SENSF_REQ command to a P2P application 41L and a T3T application 42L which are logical targets and the ESE 32 and the UICC 34 which are physical targets.

Figure 9:
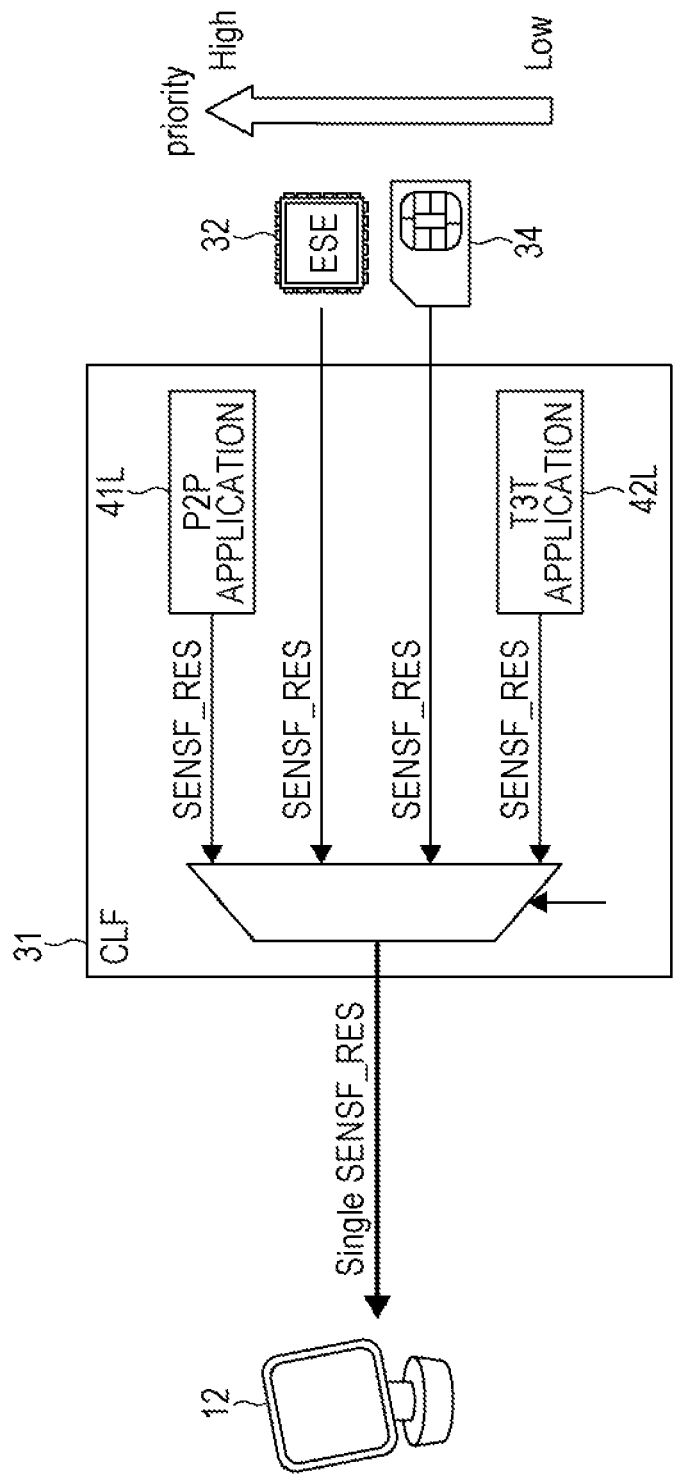
FIG. 9 is a diagram showing a process of a SENSF_RES command.

As shown in FIG. 9, when the SENSF_REQ command is transmitted from the CLF 31, a response with a SENSF_RES command is replied by each target according to the SENSF_REQ command. Then, the CLF 31 selects a candidate of the final target for the reply of a response, according to the priority with respect to the response, from the targets which have replied the response. The CLF 31 replies the SENSF_RES from the selected candidate of the final target to the NFC reader 12 according to the single response system.

When the response is replied from the P2P application 41L, the T3T application 42L, the ESE 32, and the UICC 34, the CLF 31 selects the response of the P2P application 41 with highest priority among the responses, according to the priority set in the order of the P2P application 41 (P2P application 41L), the ESE 32, the UICC 34, the T3T application 42 (T3T application 42L), and transmits the response to the NFC reader 12.

In addition, the plurality of responses or no response may be replied with respect to the SENSF_REQ command from the CLF 31. When there is only one target which has replied a response with the SENSF_RES command, the CLF 31 replies the SENSF_RES command from the target, to the NFC reader 12. In addition, when there is no target which has replied a response with the SENSF_RES command, the CLF 31 does not perform replying with respect to the NFC reader 12. In this case, the CLF 31 retains the current routing state.

In addition, the broadcast transmission of the SENSF_REQ command is basically performed to all targets, but the command may not be transmitted depending on the state of the target and the like.

(Process when Command Other than Polling Command is Received)

Figure 10:
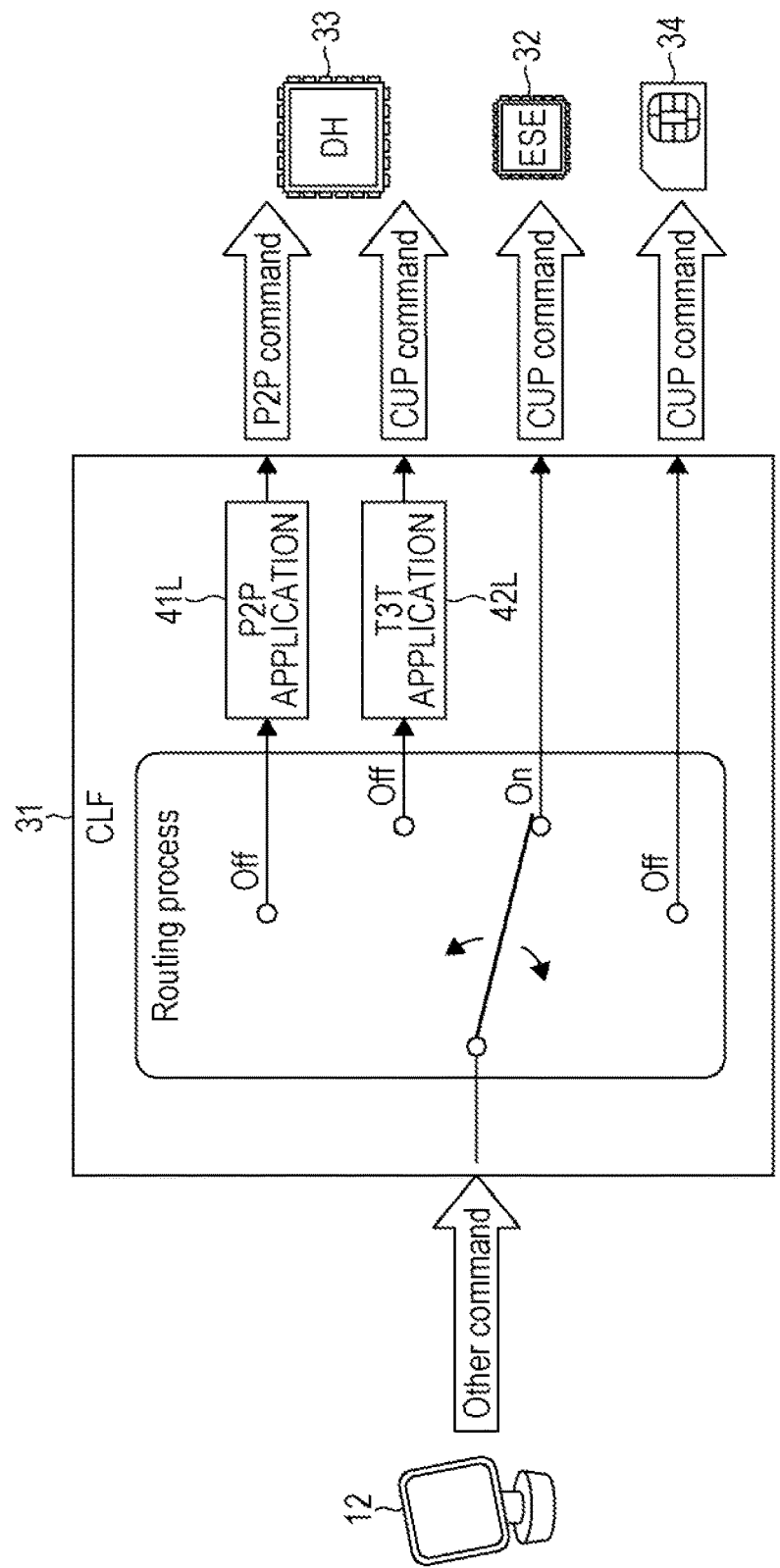
FIG. 10 is a diagram showing a process when a command other than a polling command is received.

FIG. 10 is a diagram showing a process when a command other than the polling command is received.

When a command other than the SENSF_REQ is received from the NFC reader 12, the CLF 31 transmits the command to a specific target. That is, since the command other than the SENSF_REQ is transmitted to the specific target after the NFC reader 12 specifies a desired target, identification information of the specific target is included in a packet storing the command. Accordingly, the CLF 31 selects any one of the P2P application 41, the T3T application 42, the ESE 32, or the UICC 34 according to the identification information of the target, and the command is transmitted thereto.

As described above, the processes in the CLF 31 when the polling command is received and the processes in the CLF 31 when the command other than the polling command is received, are different from each other.

[Process on Received Packet in Each Routing State]

Next, a process on the received packet in each routing state described above will be described.

(Process on Received Packet in Neutral State)

Figure 11:
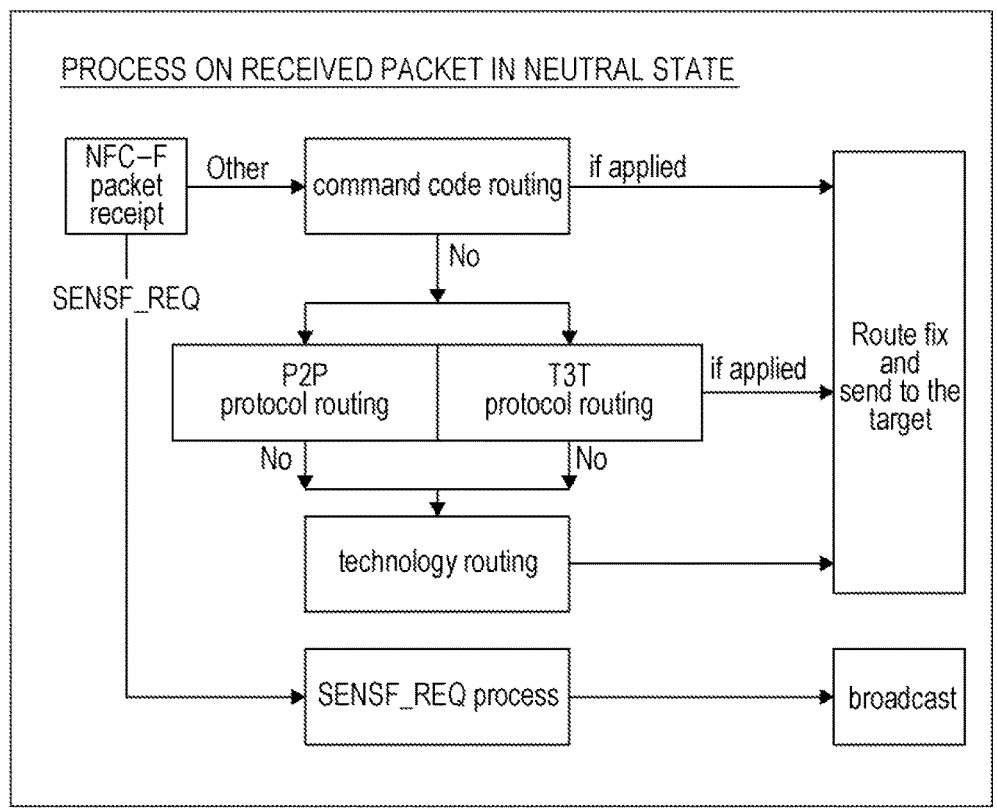
FIG. 11 is a diagram showing a process of a received packet in a neutral state.

FIG. 11 is a diagram showing an outline of a process on the received packet in the neutral state.

In the routing system performed in the process on the received packet in the neutral state, there are three types of command code routing, protocol routing, and technology routing.

The command code routing is a routing system of constantly monitoring the command from the NFC reader 12 and transmitting the received packet to the target corresponding to the command when the specific command is received.

The protocol routing is a routing system of determining to which protocol the received packet belongs, by a protocol base, and transmitting the received packet to the target according to the determined result. In the protocol routing, for example, it is determined whether the protocol of the received packet is a protocol of the P2P or a protocol of the T3T. Hereinafter, the routing according to the determined result as the protocol of the P2P is referred to as P2P protocol routing, and the routing according to the determined result as the protocol of the T3T is referred to as T3T protocol routing.

The technology routing is a routing system of transmitting the received packet to the target specified in advance, when the received packet does not belong to any protocol. In the technology routing, for example, when the protocol of the P2P and the T3T is invalid in a mounting state, for example, it is previously determined to transmit a packet of NFC-F to a first target and to transmit a packet of NFC-B to a second target, and accordingly, the received packet can be transmitted to the corresponding target.

As shown in FIG. 11, when the SENSF_REQ command is received from the NFC reader 12, the broadcast transmission of the SENSF_REQ command is performed to each target. Meanwhile, when the command other than the SENSF_REQ is received from the NFC reader 12, the command code routing is first performed, and when the final target is selected, the received packet is transmitted to the final target.

When the final target is not selected in the command code routing, the P2P protocol routing and the T3T protocol routing are performed. When the final target is selected by the protocol routing described above, the received packet is transmitted to the final target.

In addition, when the final target is not selected in the protocol routing, the technology routing is performed. In the technology routing, a transmission destination of the received packet is determined, and accordingly the received packet is transmitted to a target which is a transmission destination.

In addition, since the command code routing is performed for realizing a specific function in a specific operation, the command code routing may not be mounted depending on the operation. In this case, when the command other than the SENSF_REQ is received, the CLF 31 starts the protocol routing without performing the command code routing. In addition, when the final target is not selected in the protocol routing, the CLF 31 performs the technology routing.

Figure 12:
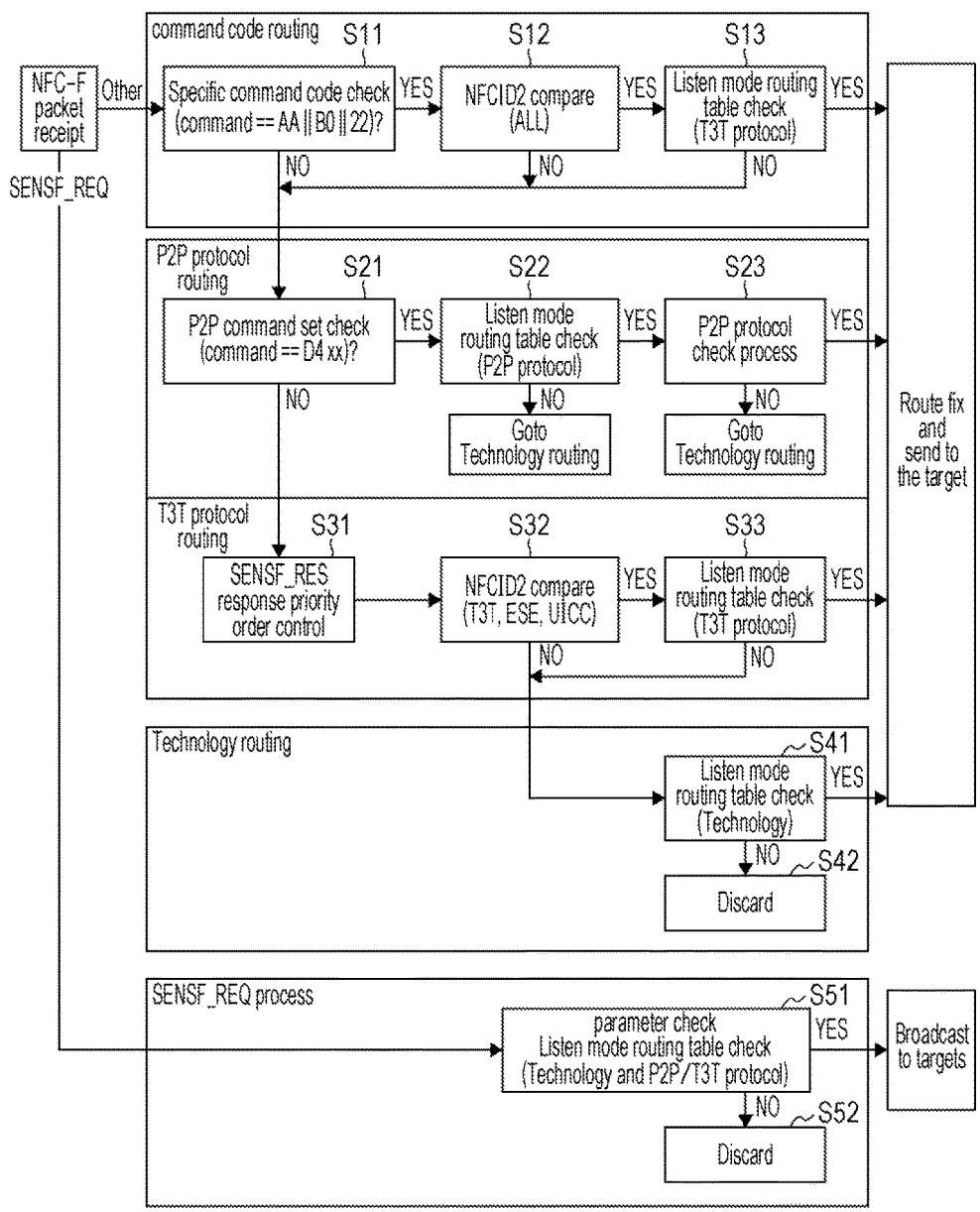
FIG. 12 is a diagram showing a process of a received packet in a neutral state.

Next, the process on the received packet in the neutral state will be described in detail with reference to FIG. 12. FIG. 12 shows content of the specific process of each routing shown in FIG. 11.

In the command code routing, first, a command code of the received packet is checked (S11). When checking conditions in S11 are satisfied, NFCID2 of the received packet and NFCID2 of all targets are compared to each other (S12). When NFCID2 thereof coincide with each other in S12, it is checked whether or not a predetermined target is registered in a predetermined routing table (S13). Then, when checking conditions in S13 are satisfied, the target is selected as the final target. For example, when the DH 33 is registered in the routing table as a target of the protocol routing of T3T, the NFC reader can communicate with the DH 33, and accordingly the T3T application 42 is selected as the final target.

When the checking conditions in S11, S12, or S13 described above are not satisfied, the command code routing ends, and then the P2P protocol routing is performed.

In the P2P protocol routing, it is checked whether or not the received command is a command of the P2P (S21). When checking conditions in S21 are satisfied, the predetermined routing table is checked (S22). When checking conditions in S22 are satisfied, it is further checked whether or not the received command is a command which can be replied as a response of the protocol of P2P (S23). Then, when checking conditions in S23 are satisfied, the P2P application 41 is selected as the final target. Accordingly, the routing state transitions to the P2P selected state from the neutral state.

In addition, when the checking conditions in S21 are not satisfied, the P2P protocol routing ends, and then the T3T protocol routing is performed.

Herein, in the initial state, the priority of the response with respect to the SENSF_REQ command (SENSF_RES command) is high in the order of the P2P application 41, the ESE 32, the UICC 34, and the T3T application 42. Accordingly, if the predetermined command with respect to the P2P application 41 is not transmitted, after the P2P application 41 is selected as the candidate of the final target and replying is performed with the SENSF_RES command of the P2P application 41 as a response with respect to the SENSF_REQ command, the transaction is failed. Therefore, in the protocol routing, when the predetermined command with respect to the P2P application 41 is not received ("No" in S21), the priority of the response is changed (S31) and the priority of the P2P application 41 is lowered.

For example, the CLF 31 changes the order of the priority as the ESE 32, the UICC 34, the T3T application 42, and the P2P application 41. Accordingly, when the SENSF_REQ command is received next time, and the broadcast transmission is performed to the targets, the CLF 31 selects the ESE 32 having the highest priority as the candidate of the final target according to the changed order of the priority, and replies the response of the ESE among the SENSF_RES commands of the respective targets to the NFC reader 12.

In addition, when checking conditions in S32 which will be described later are not satisfied, the order of the priority may be changed as a process after that.

By returning to the description of FIG. 12, in the T3T protocol routing, NFCID2 stored in the received packet and NFCID2 of the targets other than the P2P application 41, that is, the T3T application 42, the ESE 32, and the UICC 34 are compared with each other (S32). When the NFCID2 thereof coincide with each other in S32, it is checked whether or not a predetermined target is registered in a predetermined routing table (S33). Then, when checking conditions in S33 are satisfied, the target is selected as the final target. Accordingly, the routing state transitions to the T3T selected state from the neutral state.

When the checking conditions in S22, S23, S32, or S33 described above are not satisfied, the protocol routing ends, and then the technology routing is performed.

In the technology routing, the predetermined routing table is checked (S41). When checking conditions in S41 are satisfied, the target is selected as the final target. Accordingly, the routing state transitions to the T3T selected state from the neutral state.

Meanwhile, when the checking conditions in S41 are not satisfied, the received packet is discarded (S42), and the process on the received packet ends.

In addition, when SENSF_REQ command is received, a parameter stored in the received packet or the predetermined routing table is checked in the process on SENSF_REQ (S51). When checking conditions in S51 are satisfied, the broadcast transmission of the SENSF_REQ command is performed to each target. Meanwhile, when the checking conditions in S51 are not satisfied, the received packet is discarded (S52).

As described above, in the process on the received packet in the neutral state, evaluation of the received packet is performed, and the final target is selected according to the evaluated result. In addition, if the final target is selected, the routing state transitions to the P2P selected state or the T3T selected state from the neutral state. Further, when the P2P application 41 is not selected as the final target in the P2P protocol routing although the response of the P2P application 41 which is selected as the candidate of the final target is replied to the NFC reader 12, the order of the priority of the response is changed, and the priority of the P2P application 41 is lowered.

(Process on Received Packet in T3T Selected State)

Figure 13:
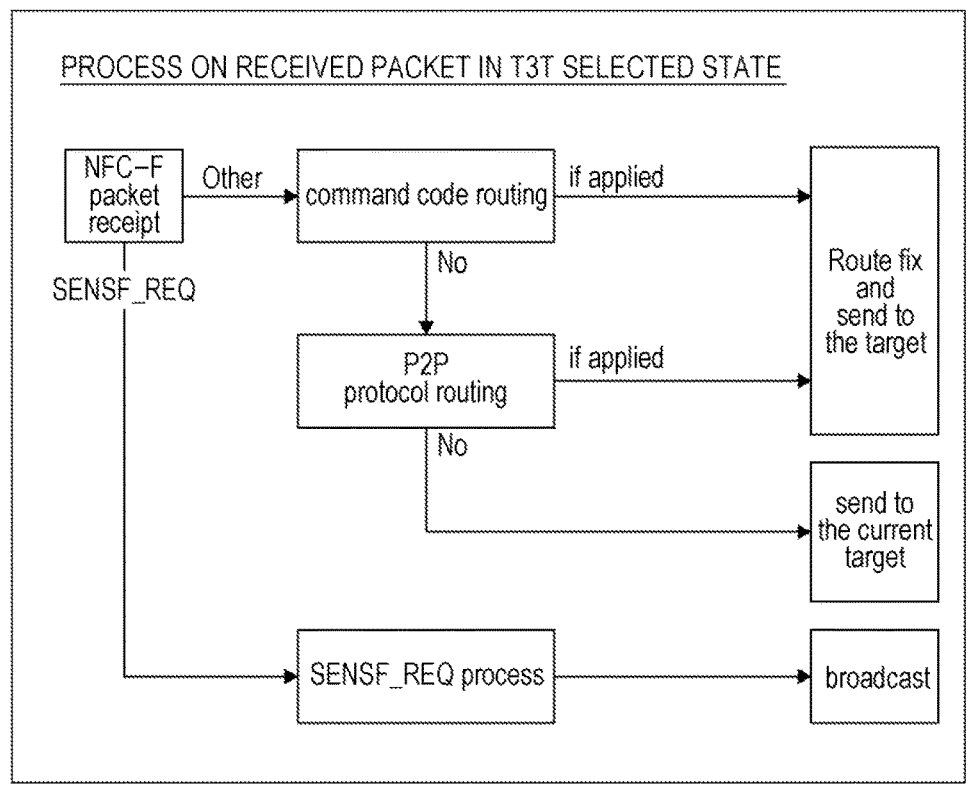
FIG. 13 is a diagram showing a process of a received packet in a T3T selected state.

FIG. 13 is a diagram showing an outline of a process on the received packet in the T3T selected state.

The routing systems performed in the process on the received packet in the T3T selected state are the command code routing and the P2P protocol routing.

As shown in FIG. 13, when the SENSF_REQ command is received from the NFC reader 12, the broadcast transmission of the SENSF_REQ command is performed to each target. Meanwhile, when the command other than the SENSF_REQ is received from the NFC reader 12, the command code routing is first performed.

In addition, when the final target is not selected in the command code routing, the P2P protocol routing is performed. That is, as shown in the diagram (FIG. 6) showing transition of the state described above, the routing state may transition to the P2P selected state from the T3T selected state, and accordingly the P2P protocol routing is also performed in the T3T selected state. When the P2P application 41 is selected as the final target in the P2P protocol routing, the routing state transitions to the P2P selected state from the T3T selected state. Meanwhile, when the P2P application 41 is not selected as the final target, the final target is not changed from the current target, and the routing state is also not changed from the T3T selected state.

In addition, as described above, when the command code routing is not mounted, only the P2P protocol routing is performed.

Figure 14:
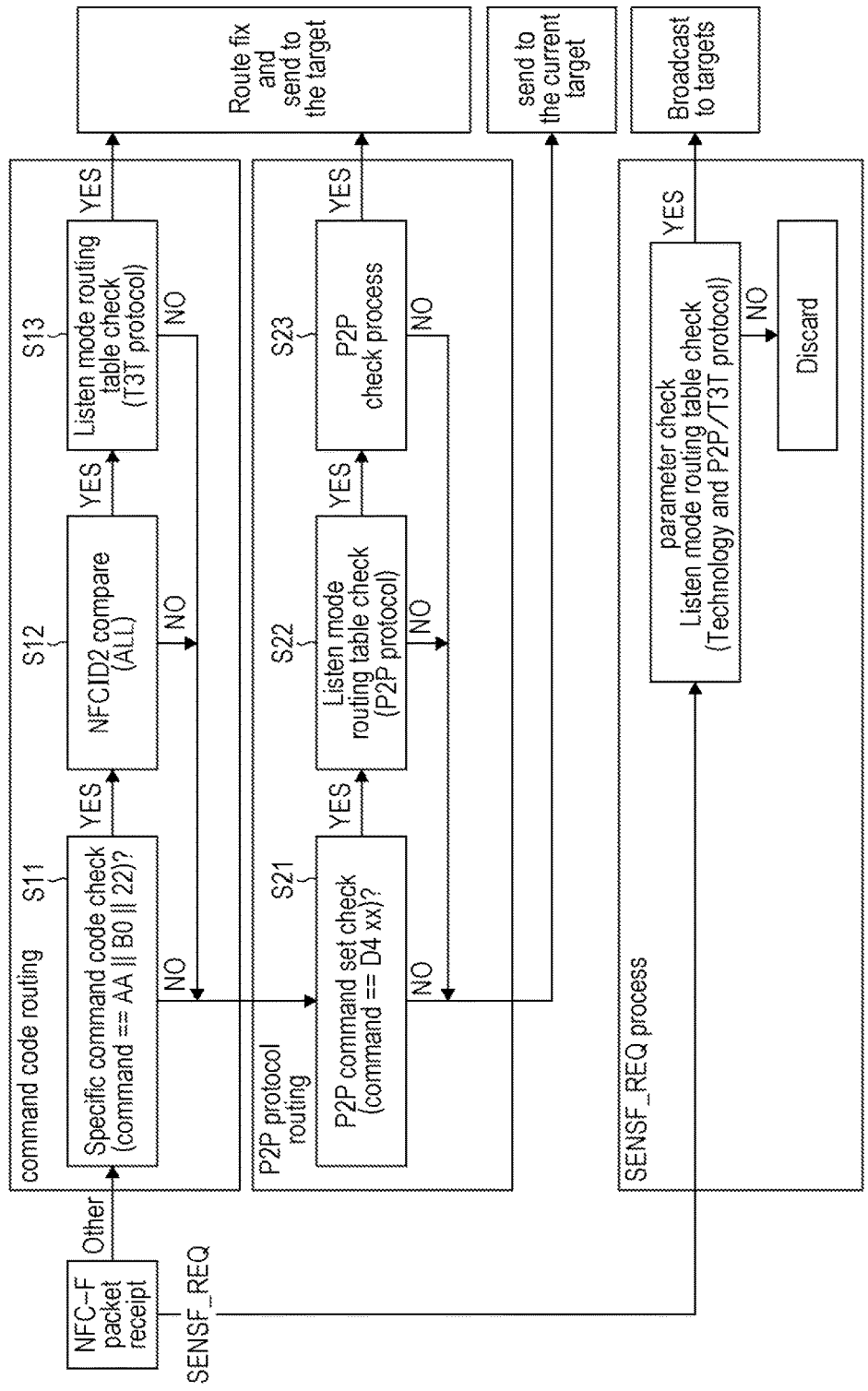
FIG. 14 is a diagram showing a process of a received packet in a T3T selected state.

Next, the process on the received packet in the T3T selected state will be described in detail with reference to FIG. 14. FIG. 14 shows content of the specific process of each routing shown in FIG. 13.

In FIG. 14, the command code routing and the P2P protocol routing are performed in the same manner as in FIG. 12, and therefore the description thereof will be omitted. However, when the checking conditions in S21, S22, and S23 of FIG. 14 are not satisfied, the protocol routing ends, and the final target and the routing state are not changed, and accordingly the received packet is transmitted to the current target. In addition, the order of the priority of the response described above is not changed in the process of FIG. 14.

In addition, when the SENSF_REQ command is received, the process on the SENSF_REQ is performed in the same manner as in FIG. 12.

As described above, in the process on the received packet in the T3T selected state, only the command code routing and the P2P protocol routing are performed, and the final target is selected according to the evaluated result of the routing described above.

(Process on Received Packet in P2P Selected State)

Figure 15:
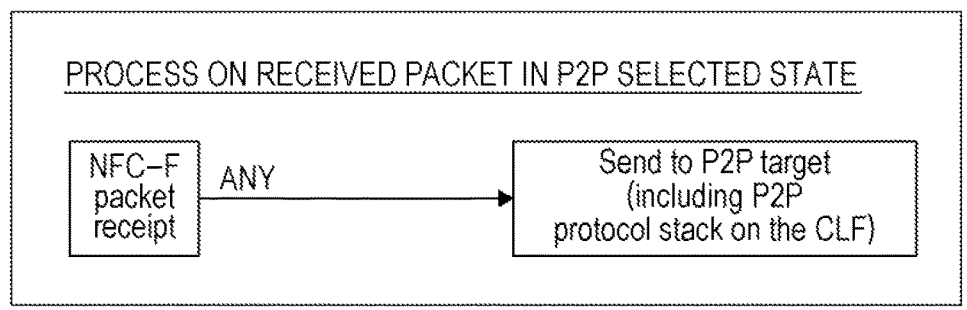
FIG. 15 is a diagram showing a process of a received packet in a P2P selected state.

FIG. 15 is a diagram showing a process on the received packet in the P2P selected state.

As shown in FIG. 15, in the process on the received packet in the P2P selected state, the CLF 31 transmits all of the received packets from the NFC reader 12 to the P2P application 41.

As described above, in the process on the received packet in the P2P selected state, the received packet is constantly transmitted to the P2P application 41 which is the final target, without performing the evaluation of the received packet.

Hereinabove, the process on the received packet has been described.

[Specific Operation Example]

Next, the specific operation examples of the present technology will be described with reference to the sequence diagrams of FIG. 16 and FIG. 17.

Figure 16:
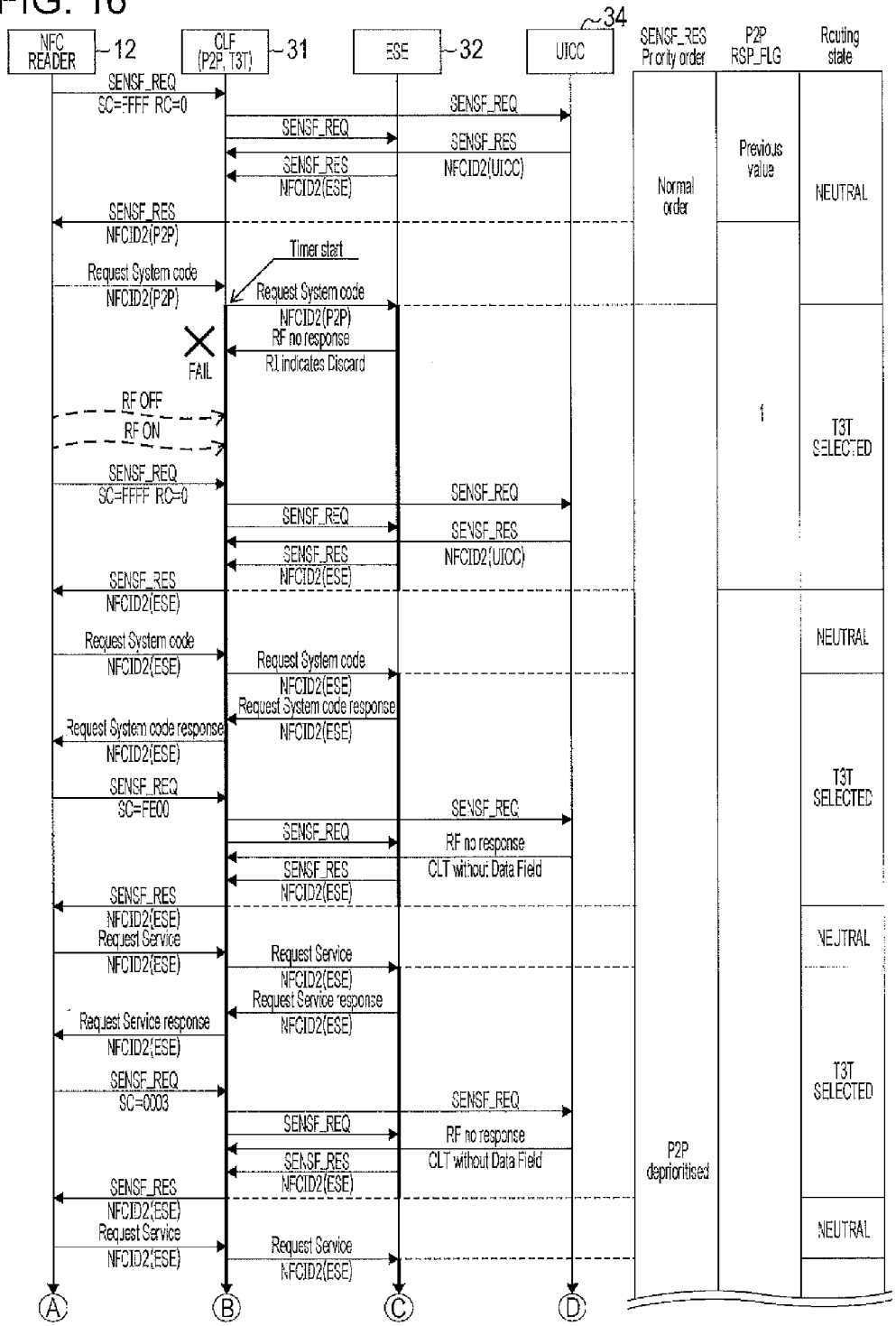
FIG. 16 is a sequence diagram showing a specific operation example of the present technology.
Figure 17:
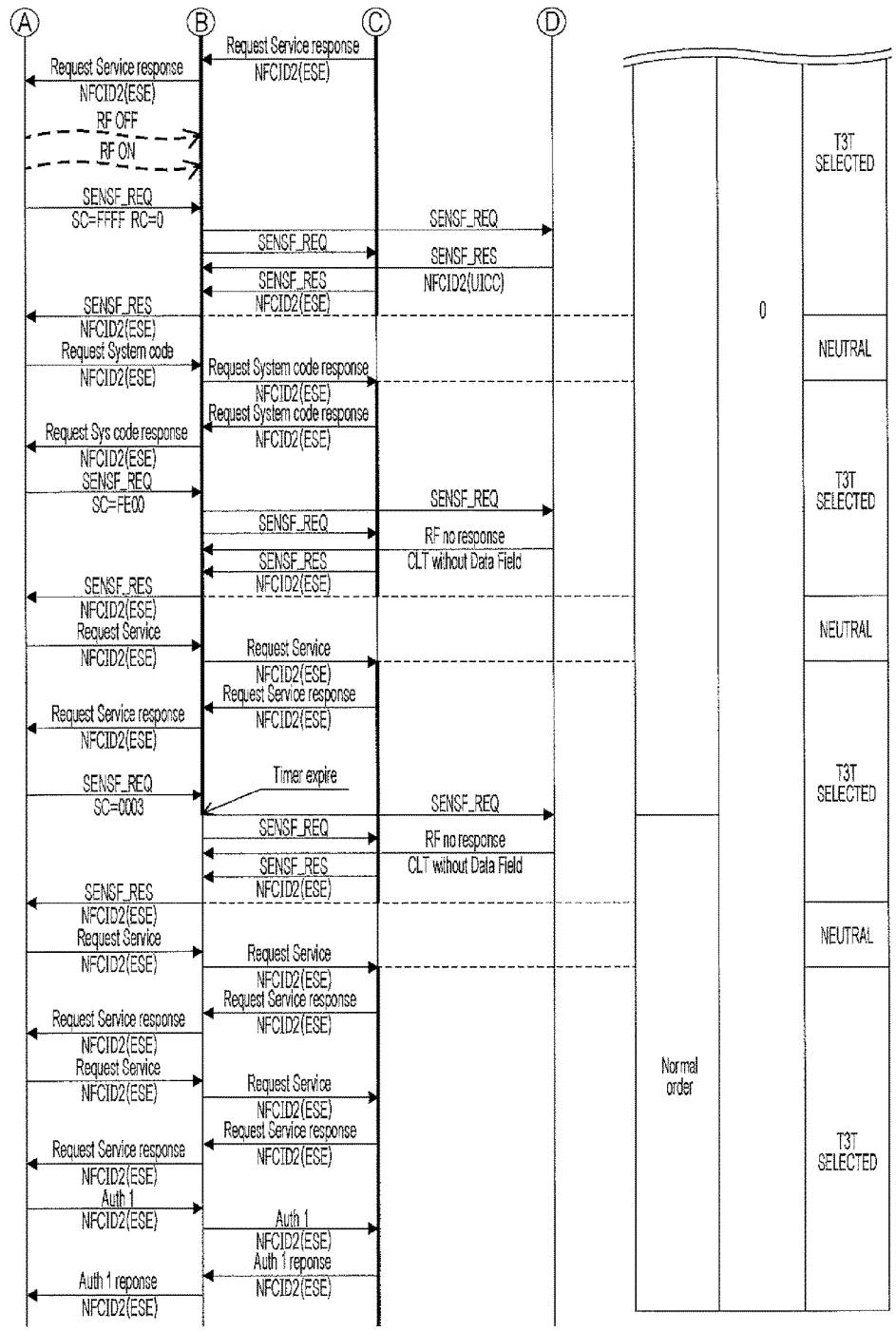
FIG. 17 is a sequence diagram showing a specific operation example of the present technology.

FIG. 16 and FIG. 17 show the operation of the CLF 31, the ESE 32, and the UICC 34 with respect to the command from the NFC reader 12. In addition, the processes on the P2P application 41L and the T3T application 42L which are the logical targets are performed in the CLF 31. Herein, the application program desired by the NFC reader 12 exists in the ESE 32.

In addition, a column "SENSF_RES Priority order" shown on the right side of the drawings shows a state of the order of the targets regarding the priority of the response. "Normal order" means the order of the priority in which the priority of the P2P application 41 is highest. In addition, "P2P deprioritised" means the order of the priority in which the priority of the P2P application 41 is lowered.

"P2P_RSP_FLG" is a flag which is set when replying a response with the SENSF_RES command of the P2P application 41. "P2P_RSP_FLG" is cleared when replying a response with the SENSF_RES command of the target other than the P2P application 41, or when the routing state returns to the neutral state. In addition, "Routing State" shows the routing state described above, and shows any state of the neutral state, the P2P selected state, and the T3T selected state.

As shown in FIG. 16, when the SENSF_REQ command is transmitted from the NFC reader 12, the CLF 31 receives the SENSF_REQ command and performs the broadcast transmission thereof to each target. The SENSF_REQ command subjected to the broadcast transmission is received by the ESE 32 and the UICC 34, and the responses thereof are replied to the CLF 31. In addition, the CLF 31 performs a process relating to the P2P application 41L and the T3T application 42L with respect to the SENSF_REQ command.

Since the priority of the P2P application 41 is highest in the initial state, the CLF 31 selects the P2P application 41 as the candidate of the final target, and replies a response with the SENSF_RES command including NFCID2 of the P2P application 41 to the NFC reader 12. By doing so, the NFC reader 12 transmits a Request System code command including NFCID2 of the P2P application 41, according to the SENSF_RES command from the CLF 31. The CLF 31 transmits the Request System code command transmitted from the NFC reader 12 to the ESE 32, but since the command is transmitted to the erroneous target, it is difficult to acquire a response. As a result, it is also difficult for the NFC reader 12 to acquire a response, and in this case, the transaction is assumed to be failed ("FAIL" in the drawing).

That is, in the CLF 31, if the command other than an ATR_REQ command, a command set for Ad-hoc communication, and a Get Container Issue Information command is received, after the SENSF_RES command of the P2P application 41 is replied as a response with respect to the SENSF_REQ command in which a system code (SC) of the polling parameter is "FFFF", the transaction thereof is failed. Herein, the ATR_REQ command is a command used in the P2P communication regulated by the NFC standard. In addition, the command set for Ad-hoc communication is a command for Ad-hoc communication based on a predetermined standard. The Get Container Issue Information command is a command for acquiring information relating to an IC chip based on a predetermined standard.

In this case, the CLF 31 changes the order of the priority of the response from the target, to the order of the ESE 32, the UICC 34, the T3T application 42, and the P2P application 41, and the priority of the P2P application is lowered. Accordingly, the next transaction in the targets other than the P2P application 41 is successful. In addition, the CLF 31 changes the order of the priority only for a predetermined time period, for example, for 5 seconds to 10 seconds. The order of the priority is returned to the initial order after the predetermined time period, and the priority of the P2P application 41 becomes highest. Basically, a time period from "Timer start" of FIG. 16 to "Timer expire" of FIG. 17 is a time period for changing the order of the priority.

Meanwhile, when the transaction is failed, the NFC reader 12 temporarily turns the RF signal off and then turns the RF signal on again. Then, the NFC reader 12 transmits the SENSF_REQ command again. The CLF 31 receives the SENSF_REQ command from the NFC reader 12, and the broadcast transmission of the command is performed to each target. The ESE 32 and the UICC 34 reply the SENSF_RES command, respectively.

Since the order of the priority of the response is changed and the priority of the ESE 32 is highest, the CLF 31 selects the ESE 32 as the candidate of the final target and replies the SENSF_RES command including the NFCID2 of the ESE 32 to the NFC reader 12. By doing so, the Request System code command including the NFCID2 of the ESE 32 is transmitted from the NFC reader 12, and accordingly the CLF 31 transmits the command to the ESE 32. At that time, the CLF 31 selects the ESE 32 selected as the candidate of the final target, as the final target. In addition, "Routing State" transitions to the T3T selected state from the neutral state.

Since the Request System code command includes the NFCID2 of the ESE 32, the ESE 32 replies a Request System code response command according to the command. The Request System code response command is transmitted to the NFC reader 12 through the CLF 31. This Request System code response command includes "FE00" as the SC of the ESE 32.

The NFC reader 12 transmits the SENSF_REQ command according to the Request System code response command, by using the SC acquired from the command. The CLF 31 receives the SENSF_REQ command from the NFC reader 12 and the broadcast transmission of the command is performed to each target, but since the UICC 34 does not support a service in which the SC is "FE00", the SENSF_RES command is replied only from the ESE 32. The CLF 31 replies the SENSF_RES command transmitted from the ESE 32 to the NFC reader 12.

The NFC reader 12 transmits a Request Service command including the NFCID2 of the ESE 32 with respect to the ESE 32, according to the SENSF_RES command including the NFCID2 of the ESE 32. The CLF 31 transmits the Request Service command transmitted from the NFC reader 12, to the ESE 32. The ESE 32 replies the Request Service response command according to the Request Service command from the CLF 31. The CLF 31 replies the Request Service response command from the ESE 32, to the NFC reader 12.

As described above, when the transaction with respect to the P2P application 41 is failed, the priority of the response from the target is changed, and therefore the transaction with respect to the ESE 32 having the highest priority at that time can be successful. In addition, if the transaction with respect to the ESE 32 is failed, the transaction is attempted to be successful in the order of the UICC 34 and the T3T application 42 having the subsequently lower priority.

Hereinafter, the same process described above is repeated until the completion time ("Timer expire" of FIG. 17) of the predetermined time period, and the process is performed between the NFC reader 12 and the ESE 32. In addition, as shown in FIG. 17, even when the RF signal is turned off by the NFC reader 12 during the predetermined time period, since the CLF 31 holds the information relating to the change of the priority, the process can be continued by assuming that the ESE 32 has the highest priority, after the RF signal is turned off.

In addition, when the completion time of the predetermined time period has been reached, the CLF 31 returns the priority of the response to the initial state and causes the priority of the P2P application 41 to be the highest. Accordingly, when the near field communication is performed with the other NFC reader after that, for example, the transaction with respect to the P2P application 41 having the highest priority is attempted to be successful.

As described above, in some operations, even when the target other than the P2P application 41 is selected as the communication target, the SC as the polling parameter included in the SENSF_REQ command initially transmitted from the NFC reader 12 may be "FFFF" and an RC (Request Code) thereof may be other than "1", that is, the communication may start with the initial command of the transaction having the same polling parameters as in the P2P communication. In this case, it is difficult for the CLF 31 to determine, from the command, whether to reply the response of the P2P application 41 or to reply the response of the target other than the P2P application 41. Accordingly, when the command other than the predetermined command such as ATR_REQ is received, after replying the response with the SENSF_RES command of the P2P application 41 with respect to the SENSF_REQ command, the transaction is failed.

Therefore, in the operation of the present technology, the order of the priority of the response with respect to the SENSF_REQ command is changed only for the predetermined time period, at a state where such conditions are satisfied, and the next transaction is successful. Accordingly, even when it is difficult for the CLF 31 to determine which response of the target to reply, the CLF 31 can subsequently select the target other than the P2P application 41 as the candidate of the final target, and therefore it is possible to reliably select the target desired by the NFC reader 12. As a result, the communication performed between the NFC reader 12 and the target can be rapidly successful.

[Extraction and Temporary Holding of NFCID2]

Next, a process relating to extraction and temporary holding of NFCID2 will be described with reference to FIG. 18 and FIG. 19.

The CLF 31 extracts the NFCID2 stored in the packet of the SENSF_RES command from the ESE 32 and the UICC 34, when replying the response with the SENSF_RES command. FIG. 18 shows a storage position of the NFCID2 in the packet of the SENSF_RES command.

The CLF 31 holds each of the NFCID2 of the ESE 32 and the UICC 34 in the memory 31A in association with the target. The CLF 31 extracts the NFCID2 each time when there is a response with respect to the SENSF_REQ command, and updates the corresponding information held in the memory 31A. In addition, regarding the NFCID2 of the P2P application 41 and the T3T application 42, identification information based on a predetermined standard is, for example, held in the memory 31A in advance.

Figure 19:
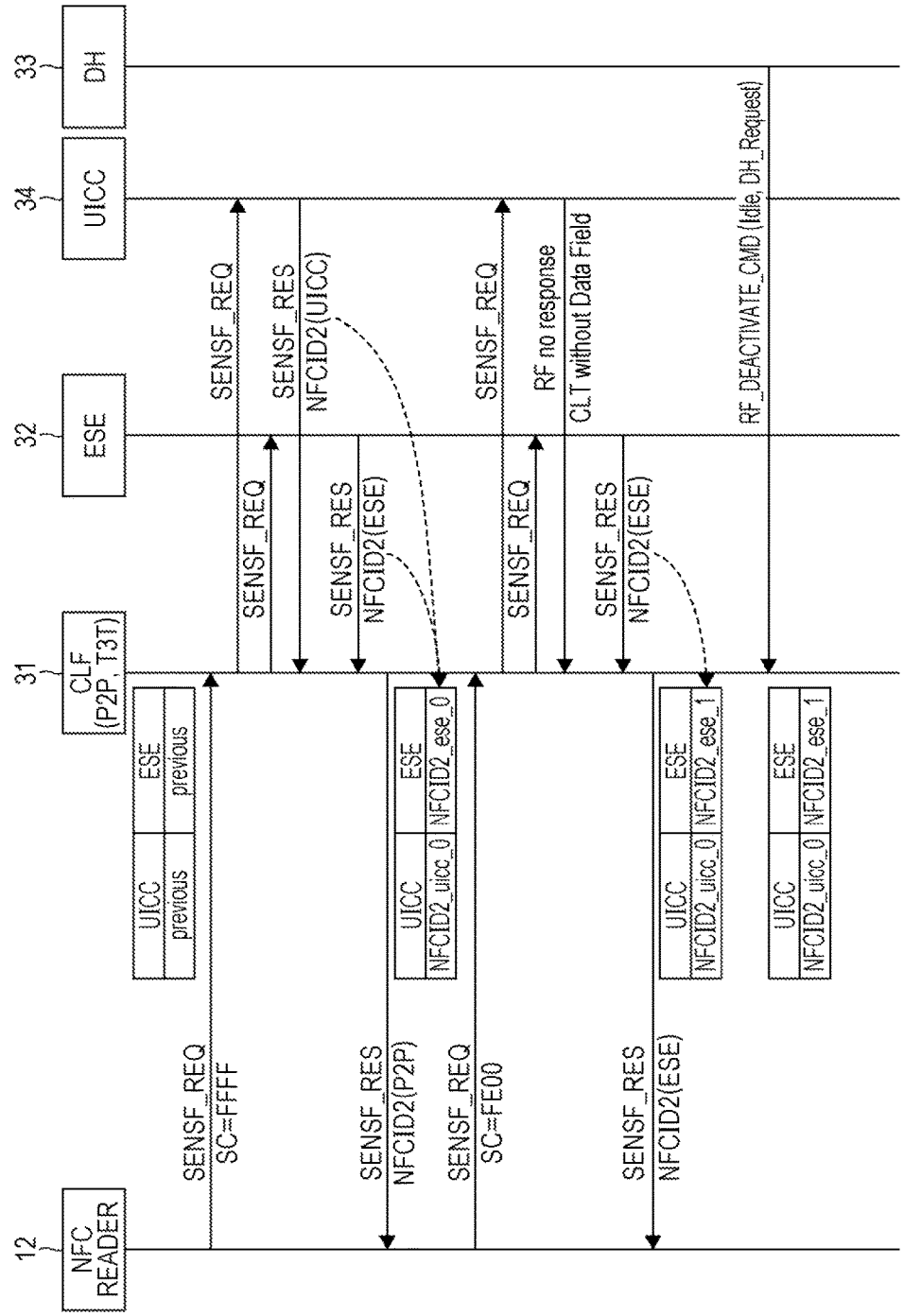
FIG. 19 is a sequence diagram showing a process of extraction and temporary holding of NFCID2.

Basically, as shown in FIG. 19, the CLF 31 performs the broadcast transmission of the SENSF_REQ command (SC="FFFF") from the NFC reader 12, and receives the response thereof from the ESE 32 and the UICC 34. The CLF 31 extracts the NFCID2 included in the SENSF_RES command from the ESE 32 and the UICC 34, and holds the NFCID2 in the memory 31A. In this example, "NFCID2_ese_0" as the NFCID2 of the ESE 32 and "NFCID2_uicc_0" as the NFCID2 of the UICC 34 are extracted, respectively and are held in the memory 31A.

In addition, when the SENSF_REQ command (SC="FF00") is transmitted from the NFC reader 12 again, the CLF 31 performs the broadcast transmission of the SENSF_REQ command, and receives the response thereof only from the ESE 32. The CLF 31 extracts "NFCID2_ese_1" as the NFCID2 included in the SENSF_RES command from the ESE 32 and holds the NFCID2_ese_1 in the memory 31A.

As described above, since the value of the NFCID2 of each target is not limited to be always the same, the CLF 31 updates the value of the NFCID2 held in the memory 31A each time when the SENSF_RES command is received.

[Replacement Process of NFCID2]

Next, a replacement process of the NFCID2 will be described with reference to FIG. 20 and FIG. 21.

Figure 20:
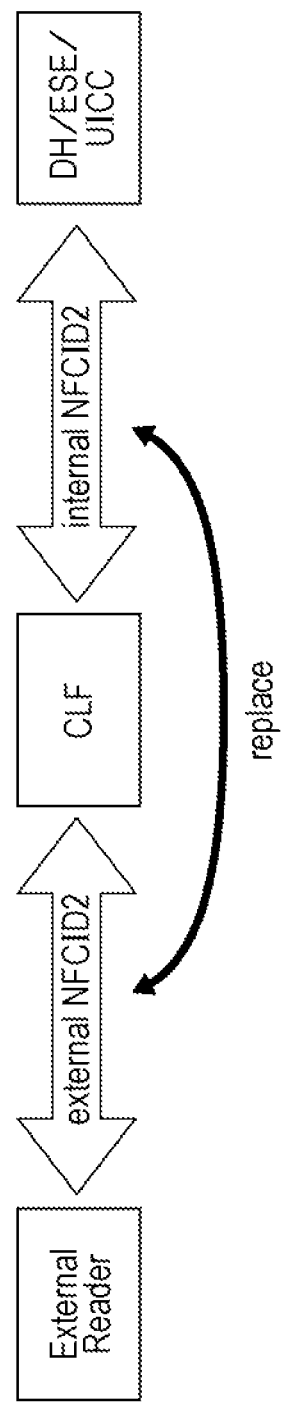
FIG. 20 is a diagram showing an outline of a replacement process of NFCID2.

As shown in FIG. 20, when the CLF 31 receives the specific command code and forcibly changes the target, it is necessary for the CLF to perform the communication by replacing the NFCID2 for communication with the NFC reader 12 with the NFCID2 for communication with the target.

For example, in a case where the Get Container Issue Information command is received, it is necessary for the CLF 31 to use the NFCID2 of the ESE 32 when forcibly changing the target to ESE 32, and thus the CLF replaces the NFCID2 in the command with the NFCID2 of the ESE 32, and performs the communication with the ESE 32. In addition, when replying to the NFC reader 12, the CLF 31 replaces the NFCID2 of the target with the NFCID2 included in the command received from the NFC reader 12 again and then replies the response thereto.

In addition, for example, when the Propose Ad-hoc Mode command is received, the CLF 31 replaces the NFCID2 in the command with the NFCID2 of the T3T application 42 of the DH 33 when forcibly changing the target to the DH 33, and then performs the communication with the T3T application 42. In addition, when performing the communication with the NFC reader 12, the communication is performed using the NFCID2 before the replacement.

Figure 21:
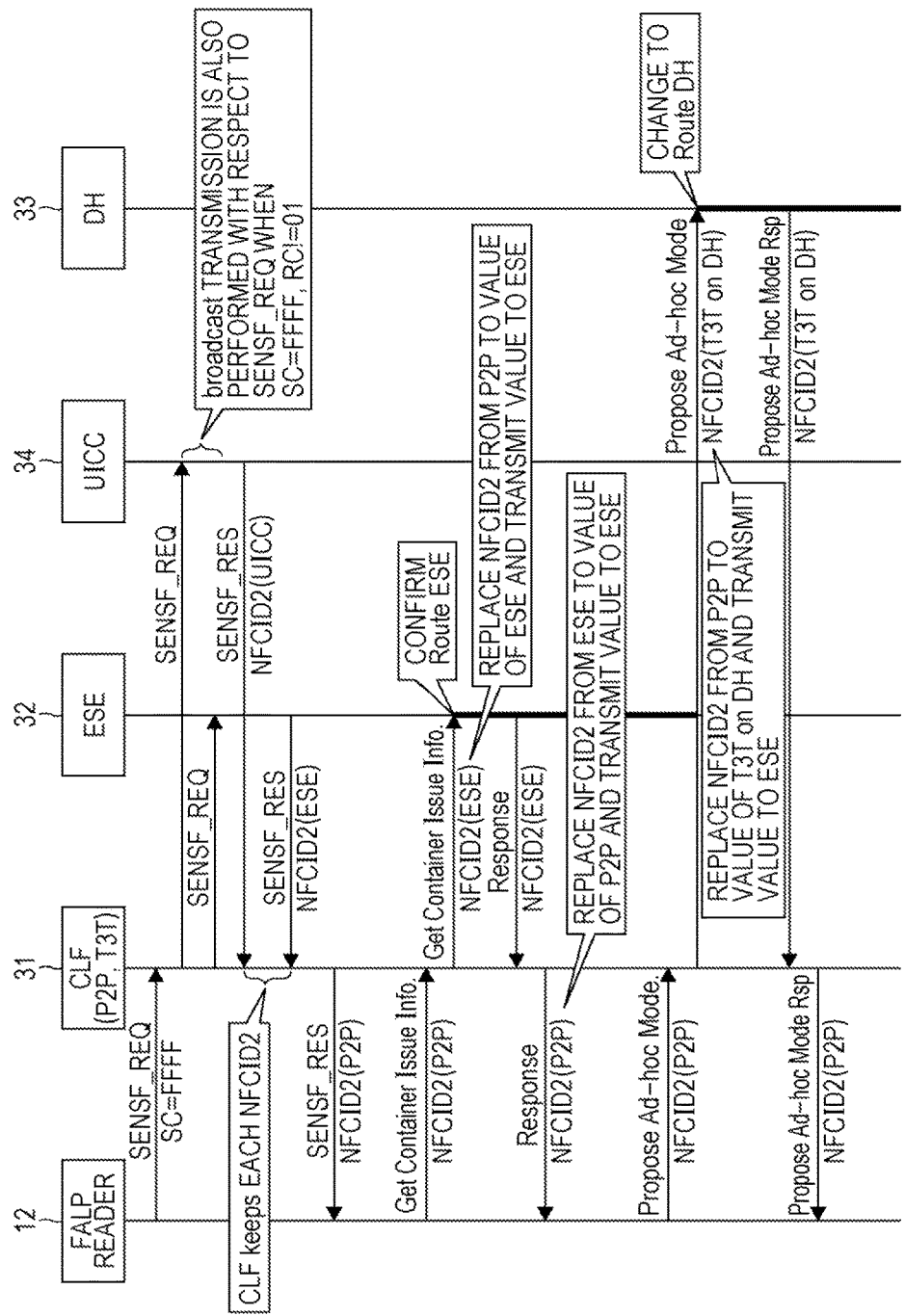
FIG. 21 is a sequence diagram showing a replacement process of NFCID2.

Specifically, as shown in FIG. 21, the CLF 31 performs the broadcast transmission of the SENSF_REQ command (SC="FFFF") from the NFC reader 12, and receives the response thereof from the ESE 32 and the UICC 34. The CLF 31 extracts the NFCID2 included in the SENSF_RES command and holds the NFCID2 thereof in the memory 31A. Then, the CLF 31 replies the SENSF_RES command including the NFCID2 of the P2P application 41 according to the priority.

In addition, when the Get Container Issue Information command is transmitted from the NFC reader 12, the CLF 31 replaces the NFCID2 included in the command with the NFCID2 of the ESE 32 from that of the P2P application 41, and transmits the NFCID2 thereof to the ESE 32. By doing so, since the response with respect to the command is transmitted from the ESE 32, the CLF 31 replaces the NFCID2 included in the response command with the NFCID2 of the P2P application 41 from that of ESE 32, and then transmits the command to the NFC reader 12.

By replacing the NFCID2 included in the command as described above, a transmission destination of the command designated by the NFC reader 12 can be forcibly changed. Such a replacement process is a necessary process, when performing the command code routing described above, for example.

[Target Deselecting Process]

Next, a deselecting process of the target will be described. The CLF 31 deselects the final target based on predetermined target deselecting conditions. The deselecting conditions include the completion operation of the application program in execution by a user, and an external factor such as loss of the RF signal.

(Deselecting Due to RF_DEACTIVATE_CMD Reception)

When the CLF 31 receives a specific command such as a RF_DEACTIVATE_CMD command (Idle Mode, DH_Request) from the DH 33, the communication with the NFC reader 12 ends, and accordingly the final target is deselected. In addition, when the command described above is received, the final target is deselected in any routing state. In this case, the routing state transitions to the neutral state.

(Deselecting Due to SENSF_RES Response at the Time of SENSF_REQ Reception)

In a case where the routing state is the T3T selected state, when the CLF 31 performs the broadcast transmission of the SENSF_REQ command from the NFC reader 12 and the response with the SENSF_RES command is acquired, the final target is deselected. In this case, the routing state transitions to the neutral state.

(Deselecting Due to RLS_REQ Reception)

In a case where the P2P application 41 is selected as the final target, the CLF 31 deselects the final target when the RLS_REQ command is received. In this case, the routing state transitions to the neutral state.

(Deselecting Due to DSL_REQ Reception)

In a case where the P2P application 41 is selected as the final target, the CLF 31 deselects the final target when the DSL_REQ command is received. In this case, the routing state transitions to the neutral state.

(Deselecting Due to Loss of RF Signal)

In a case where the P2P application 41 is selected as the final target, the CLF 31 deselects the final target when the turning off of the RF signal is detected. In this case, the routing state transitions to the neutral state.

(Deselecting Due to PSL_REQ Accompanied with Technology Change to NFC-A)

In a case where the P2P application 41 is selected as the final target, the CLF 31 deselects the final target when the PSL_REQ command accompanied with a technology change to the NFC-A is received. In this case, the routing state transitions to the neutral state.

(Other Deselecting Conditions)

The CLF 31 deselects the final target when a phenomenon of causing the transition of the state to a RFST_IDLE state other than the RF_DEACTIVATE_CMD command occurs, such as a case where device reset occurs or a case where a CORE_RESET_CMD command is received. In this case, the routing state transitions to the neutral state. In addition, the CORE_RESET_CMD command is a command for instructing the reset based on the predetermined standard.

Hereinabove, the target deselecting process has been described.

[Command Response Process]

Next, a command response process executed by the CLF 31 when receiving the command from the NFC reader 12 will be described with reference to a flowchart of FIG. 22.

In Step S101, the packet reception processing unit 101 determines whether or not the command is received from the NFC reader 12. When it is determined that the command is received in Step S101, the process proceeds to Step S102.

In Step S102, the packet reception processing unit 101 determines whether or not the received command is the SENSF_REQ command. When it is determined that the received command is the SENSF_REQ command in Step S102, the process proceeds to Step S103.

In Step S103, the packet reception processing unit 101 performs the broadcast transmission of the SENSF_REQ command to each target.

In Step S104, the packet reception processing unit 101 receives the SENSF_RES commands replied from the targets which has received the SENSF_REQ command.

In Step S105, the packet reception processing unit 101 selects the candidate of the final target to reply a response from the targets which have replied the responses, according to the priority of the response. In addition, as described above, in the order of the priority of the response in the initial state, the P2P application 41 has the highest priority.

In Step S106, the packet reception processing unit 101 transmits the SENSF_RES command from the candidate of the final target selected in Step S105, to the NFC reader 12. Accordingly, the NFC reader 12 receives the SENSF_RES command from the NFC device 11 and performs the process according to the command described above.

Meanwhile, when it is determined that the received command is the command other than the SENSF_REQ command in Step S102, the process proceeds to Step S107.

In Step S107, the packet reception processing unit 101 determines whether or not the current routing state is the neutral state. When it is determined that the current routing state is the neutral state in Step S107, the process proceeds to Step S108.

In Step S108, the packet reception processing unit 101 performs a process on the received packet in the neutral state.

Herein, the process on the received packet in the neutral state corresponding to Step S108 of FIG. 22 will be described with reference to a flowchart of FIG. 23.

In Step S131, the packet reception processing unit 101 performs the process on the received packet in the neutral state. As described with FIG. 11 and FIG. 12 described above, in the process on the received packet, the evaluation of the received packet is performed with the command code routing, the protocol routing, and the technology routing, and the final target is selected according to the evaluated result.

In addition, when the final target is selected, the routing state management unit 102 transitions the routing state to the P2P selected state or the T3T selected state from the current neutral state.

In Step S132, the packet reception processing unit 101 determines whether or not the SENSF_RES command of the P2P application 41 has been replied as the last reply with respect to the NFC reader 12. When it is determined that the response with the SENSF_RES command of the P2P application 41 is the last reply in Step S132, the process proceeds to Step S133.

In Step S133, the packet reception processing unit 101 determines whether or not the P2P application 41 is selected as the final target in the process in Step S131. When it is determined that the P2P application 41 is not selected as the final target in Step S133, the process proceeds to Step S134.

In Step S134, the priority management unit 103 changes the order of the priority. That is, in this case, since the command other than the command with respect to the P2P application 41 is received from the NFC reader 12 although SENSF_RES command of the P2P application 41 selected as the candidate of the final target is replied, the order of the priority is changed. For example, the priority management unit 103 lowers the priority of the P2P application 41 having the highest priority in the initial state, and changes the order of the priority as the ESE 32, the UICC 34, the T3T application 42, and the P2P application 41. In this case, the priority of the P2P application 41 is the lowest among the targets.

The changed order of the priority is not limited to the order described above, and the order of the priority can be changed to another order. For example, in a case where the targets are the ESE 32, the UICC 34, and the P2P application 41, the priority management unit 103 may change the priority to the order of the ESE 32, the UICC 34, and the P2P application 41, when the P2P application 41 is not selected as the final target. In this case, the priority management unit 103 may change the priority to the order of the ESE 32, the P2P application 41, and the UICC 34.

In addition, when there is only one target of one of the ESE 32 and the UICC 34, the priority management unit 103 changes the priority of the P2P application 41 to the next place of the priority of one of the ESE 32 and the UICC 34. That is, any one or both of the ESE 32 and the UICC 34 are at least included as the targets, and the priority management unit 103 changes the priority of the P2P application 41 to the next place of the priority of any one or both of the ESE 32 and the UICC 34, when the P2P application 41 is not selected as the final target.

In addition, the priority management unit 103 may change the priority of the response according to the operation sequence of the NFC reader 12.

As described above, the changed order of the priority is arbitrarily set according to the type of the target or the aspect of the operation, for example, and the priority of the P2P application 41 having the highest priority is changed to be low in principle.

When it is determined that the SENSF_RES command of the P2P application 41 is not replied as the last reply in Step S132, Steps S133 and S134 are skipped. In addition, when it is determined that the P2P application 41 is selected as the final target in Step S133, Step S134 is skipped.

Figure 22:
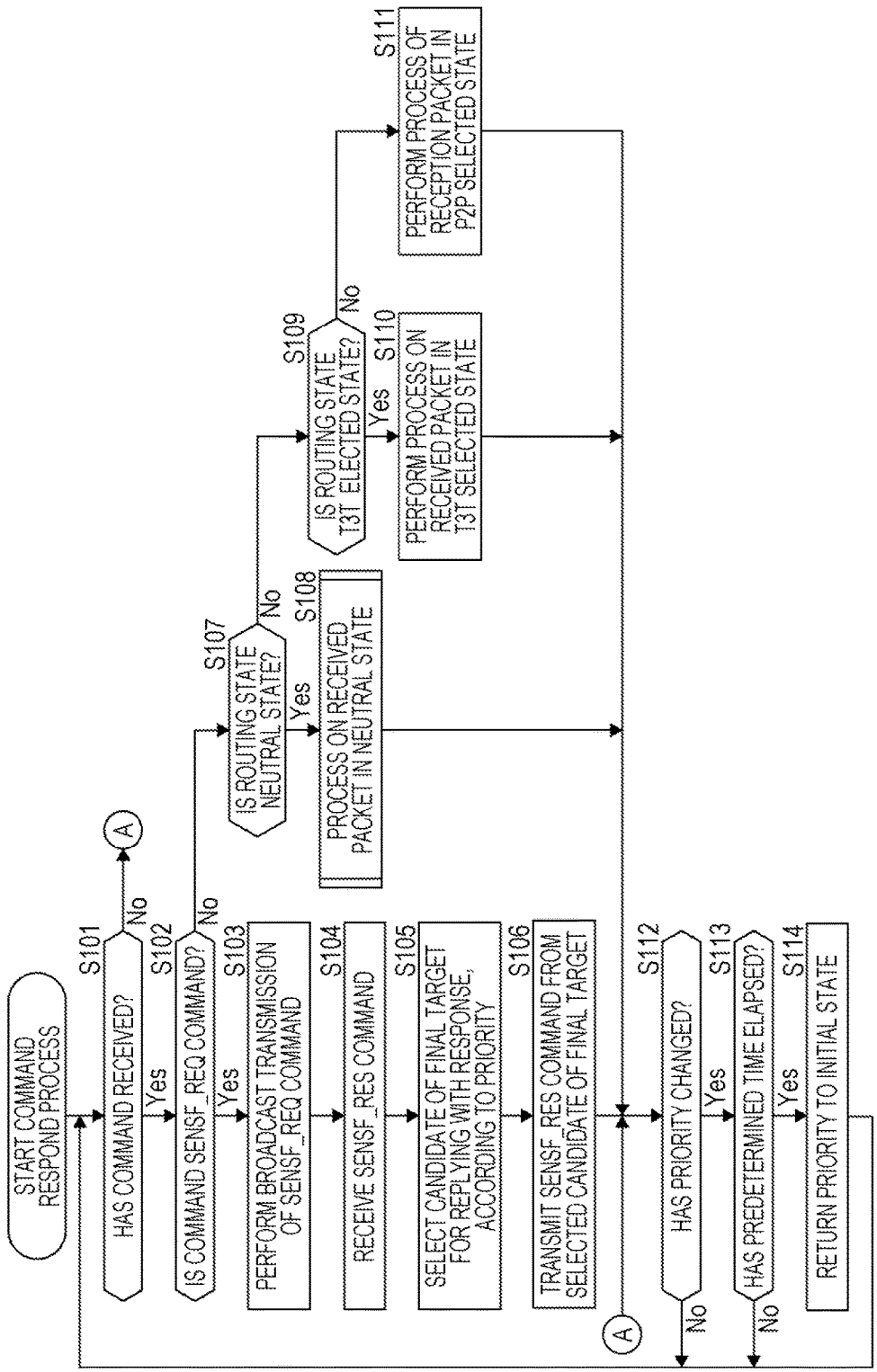
FIG. 22 is a flowchart illustrating a command response process.

When the process in Step S134 ends or is skipped, the process returns to Step S108 of FIG. 22 and the subsequent processes are performed.

In addition, when it is determined that the current routing state is not the neutral state in Step S107, the process proceeds to Step S109.

In Step S109, the packet reception processing unit 101 determines whether or not the current routing state is the T3T selected state. When it is determined that the current routing state is the T3T selected state in Step S109, the process proceeds to Step S110.

In Step S110, the packet reception processing unit 101 performs the process on the received packet in the T3T selected state. As described with FIG. 13 and FIG. 14, in the process on the received packet, the evaluation of the received packet is performed with the command code routing and the P2P protocol routing, and the final target is selected according to the evaluated result.

Meanwhile, when it is determined that the current routing state is not the T3T selected state, that is, the P2P selected state in Step S109, the process proceeds to Step S111.

In Step S111, the packet reception processing unit 101 performs the process on the received packet in the P2P selected state. As described with FIG. 15, in the process on the received packet, the received packet is constantly transmitted to the P2P application 41 without performing the evaluation of the received packet.

When it is determined that the command is not received in Step S101, or when the processes in Steps S108, S110, and S111 end, the process proceeds to Step S112.

Figure 23:
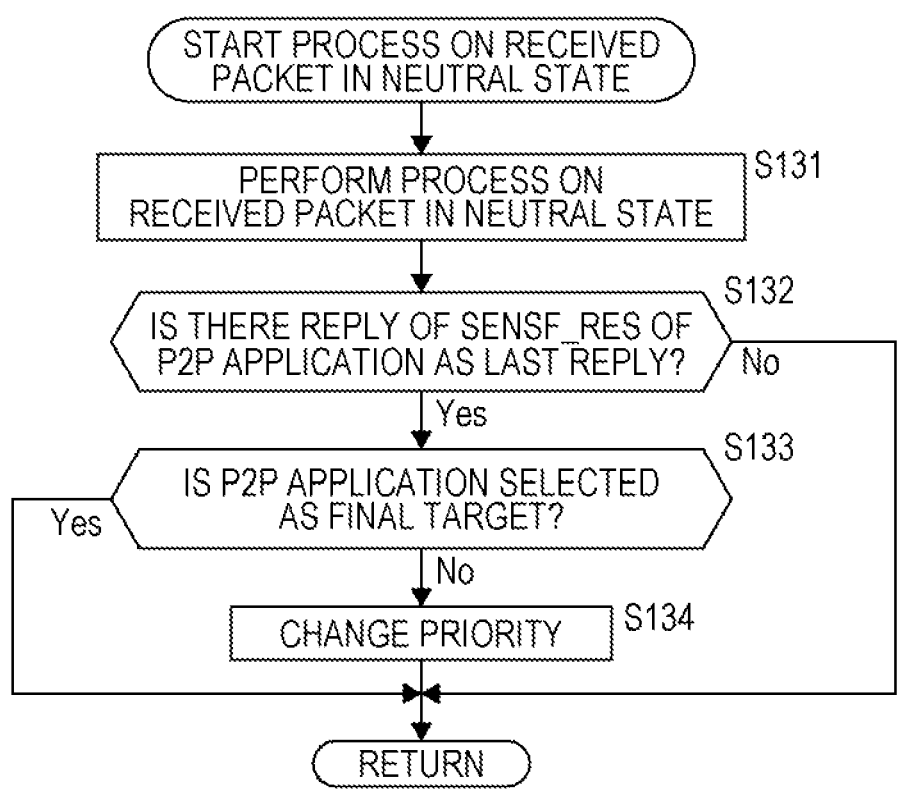
FIG. 23 is a flowchart illustrating a process of a received packet in a neutral state.

In Step S112, the priority management unit 103 determines whether or not the priority of the response is changed in Step S134 of FIG. 23. When it is determined that the priority of the response is changed in Step S112, the process proceeds to Step S113.

In Step S113, the priority management unit 103 determines whether or not the predetermined time period has elapsed. When it is determined that the predetermined time period has elapsed in Step S113, the process proceeds to Step S114.

In Step S114, the priority management unit 103 returns the priority of the response to that in the initial state, and changes the priority of the P2P application 41 to be highest.

In addition, when it is determined that the priority is not changed in Step S112, when it is determined that the predetermined time period has not elapsed in Step S113, or when the process in Step S114 ends, the process returns to Step S101 and the subsequent processes are repeated.

Hereinabove, the command response process has been described. According to the command response process, the process on the received packet according to the routing state is performed. In addition, the evaluation of the received packet is performed in the process on the received packet according to the neutral state, and when the P2P application 41 is not selected as the final target although the SENSF_RES command of the P2P application 41 is replied, the priority of the response is changed and the priority of the P2P application 41 is lowered.

[Description on Computer Using Present Technology]

The series of processes described above can be executed with hardware and can also be executed with software. When executing the series of processes with software, a program configuring the software is installed in a computer. Herein, the computer includes a computer in which dedicated hardware is installed, and a general-purpose personal computer in which, for example, various functions can be executed by installing various programs.

Figure 24:
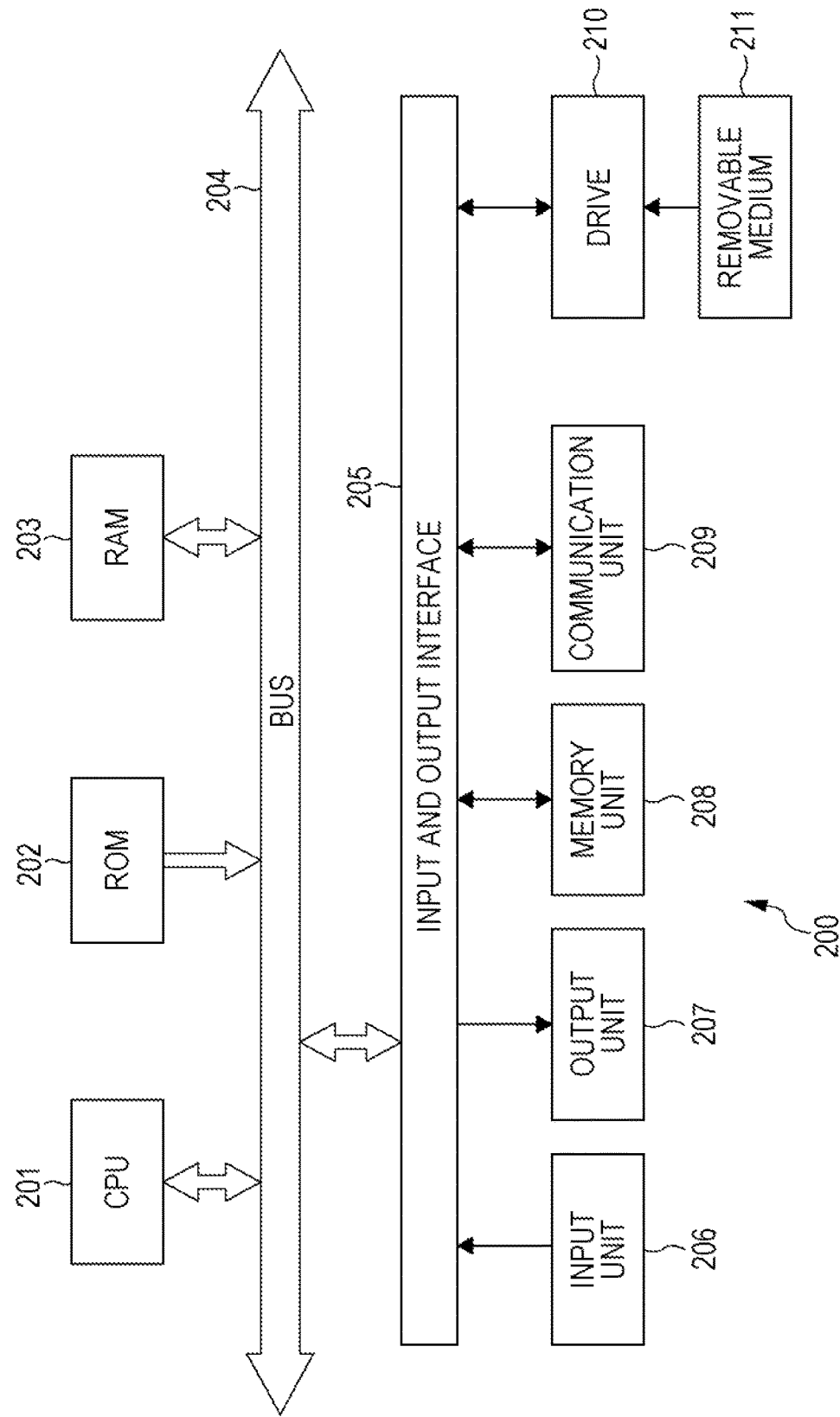
FIG. 24 is a diagram showing a configuration example of a computer.

FIG. 24 is a block diagram showing a configuration example of the hardware of the computer which executes the series of processes by the program.

In a computer 200, a central processing unit (CPU) 201, a read only memory (ROM) 202, a random access memory (RAM) 203 are connected to each other by a bus 204.

An input and output interface 205 is further connected to the bus 204. An input unit 206, an output unit 207, a storage unit 208, a communication unit 209, and a drive 210 are connected to the input and output interface 205.

The input unit 206 is configured with a keyboard, a mouse, a microphone, and the like. The output unit 207 is configured with a display, a speaker, and the like. The storage unit 208 is configured with a hard disk or a non-volatile memory. The communication unit 209 is configured with a network interface. A drive 210 drives a removable medium 211 such as a magnetic disc, an optical disc, a magneto-optical disc, or a semiconductor memory.

In the computer 200 configured as described above, the CPU 201, for example, loads and executes a program stored in the storage unit 208 in the RAM 203 through the input and output interface 205 and the bus 204, and accordingly the series of processes described above is performed.

The program executed by the computer 200 (CPU 201) can be provided by being recorded in the removable medium 211 such as a package medium, for example. In addition, the program can be provided through a wired or wireless transmission medium such as a local area network, the Internet, or digital satellite broadcasting.

In the computer 200, the program can be installed in the storage unit 208 through the input and output interface 205, by mounting the removable medium 211 on the drive 210. In addition, the program can be received by the communication unit 209 through the wired or wireless transmission medium to be installed in the storage unit 208. In addition, the program can be installed in the ROM 202 or the storage unit 208 in advance.

Further, the program executed by the computer 200 may be a program with which a process is performed in time series according to the order described in the present description, or may be a program with which a process is performed in parallel or at a necessary timing when there is a request, for example.

Herein, in the present description, the process step of describing the program for causing the computer 200 to perform various processes is not necessarily processed in time series according to the order disclosed in the flowchart, and may be processed in parallel or individually (for example, parallel process or process due to an object).

In addition, the program may be processed by one computer or may be processed separately by the plurality of computers. Further, the program may be executed by being transmitted to a distant computer.

In addition, in the present description, the system means an assembly of a plurality of constituent elements (device, module (component), and the like), whether or not all constituent elements are in the same enclosure. Accordingly, both of the plurality of devices accommodated in the separate enclosures and connected to each other through a network, and one device with a plurality of modules accommodated in one enclosure are the system.

The embodiments of the present technology are not limited to the embodiments described above, and various changes can be performed within a range not departing from a scope of the present technology.

For example, the present technology can have a configuration of cloud computing for sharing one function with the plurality of devices and jointly processing the function through the network.

In addition, each step described with the flowcharts described above can be executed with one device, and can also be executed being shared with the plurality of devices.

Further, when the plurality of processes are included in one step, the plurality of processes included in the step can be executed with one device, and can also be executed being shared with the plurality of devices.

In addition, the present technology can be configured as follows.

(1) A communication device including:

a plurality of targets which execute a predetermined process, respectively; and a front end which selects a final target to be a communication target of an external device from the plurality of targets and performs near field communication with the external device, in which the plurality of targets include an application of P2P (Peer to Peer), and the front end transmits a first command which is received from the external device for selecting a candidate of the final target, to the plurality of targets, selects the candidate of the final target by setting the application of P2P as a target having the highest priority in the selection of the candidate of the final target, selects the candidate of the final target as the final target, based on a second command which is received from the external device and includes identification information of a predetermined target, and lowers the priority of the application of P2P in the selection of the candidate of the final target, in a case where the application of P2P is selected as the candidate of the final target and the application of P2P is not selected as the final target.

(2) The communication device according to (1), in which the front end performs broadcast transmission of the first command to the plurality of targets, in a case where the first command is received from the external device.

(3) The communication device according to (1) or (2), in which the other targets excluding the application of P2P among the plurality of targets, include at least any one or both of a secure element and a universal integrated circuit card (UICC), and the front end changes the priority of the application of P2P to the next place of the priority of any one or both of the secure element and the UICC.

(4) The communication device according to (3), in which the front end changes the priority so that a higher priority is assigned in the order of the secure element, the UICC, and the application of P2P.

(5) The communication device according to (3), in which the front end changes priority so that a higher priority is assigned in the order of the secure element, the application of P2P, and the UICC.

(6) The communication device according to (3), in which the other targets further include a predetermined application based on a predetermined standard, and the front end changes the priority so that a higher priority is assigned in the order of the secure element, the UICC, the predetermined application, and the application of P2P.

(7) The communication device according to any one of (1) to (3), in which the front end changes the priority of the application of P2P to be the lowest priority.

(8) The communication device according to any one of (1) to (3), in which the front end changes the priority according to an operation sequence of the external device.

(9) The communication device according to any one of (1) to (3), in which, in a case where the priority of the application of P2P is changed and a predetermined period of time which is set in advance has elapsed, the front end returns the priority of the application of P2P to be the highest priority.

(10) The communication device according to any one of (1) to (3), in which the front end deselects the final target from the communication target of the external device, based on predetermined target deselecting conditions.

(11) The communication device according to (10), in which, in a case where the broadcast transmission of the first command is performed to the plurality of targets and a response is replied from any target, the front end deselects the final target from the communication target of the external device.

(12) The communication device according to any one of (1) to (11), in which the front end selects the candidate of the final target as the final target, when the identification information included in the second command and identification information of the candidate of the final target coincide with each other.

(13) A control method of a communication device which includes a plurality of targets which execute a predetermined process, respectively, and a front end which selects a final target to be a communication target of an external device from the plurality of targets and performs near field communication with the external device, in which the plurality of targets include an application of P2P (Peer to Peer), and the method includes causing the front end:

to transmit a first command which is received from the external device for selecting a candidate of the final target, to the plurality of targets;

to select the candidate of the final target by setting the application of P2P as a target having the highest priority in the selection of the candidate of the final target;

to select the candidate of the final target as the final target, based on a second command which is received from the external device and includes identification information of a predetermined target; and to lower the priority of the application of P2P in the selection of the candidate of the final target, in a case where the application of P2P is selected as the candidate of the final target and the application of P2P is not selected as the final target.

(14) A program for controlling a communication device which includes a plurality of targets which execute a predetermined process, respectively, and a front end which selects a final target to be a communication target of an external device from the plurality of targets including an application of P2P (peer to peer) and performs near field communication with the external device, the program causing a computer of the communication device to execute processes of:

transmitting a first command which is received from the external device for selecting a candidate of the final target, to the plurality of targets;

selecting the candidate of the final target by setting the application of P2P as a target having the highest priority in the selection of the candidate of the final target;

selecting the candidate of the final target as the final target, based on a second command which is received from the external device and includes identification information of a predetermined target; and lowering the priority of the application of P2P in the selection of the candidate of the final target, in a case where the application of P2P is selected as the candidate of the final target and the application of P2P is not selected as the final target.

(15) A front end including:

a plurality of wired interfaces connected to a plurality of targets, in which the front end transmits a first command which is received from the external device for selecting a candidate of the final target, to the plurality of targets through the wired interfaces, selects the candidate of the final target by setting an application of P2P as a target having the highest priority in the selection of the candidate of the final target, selects the candidate of the final target as the final target, based on a second command which is received from the external device and includes identification information of a predetermined target, controls to lower the priority of the application of P2P in the selection of the candidate of the final target, in a case where the application of P2P is selected as the candidate of the final target and the application of P2P is not selected as the final target, and selects the final target to be the communication target of the external device from the plurality of targets connected by the wired interfaces.

REFERENCE SIGNS LIST

11 NFC DEVICE
12 NFC READER
31 CLF
31A MEMORY
32 ESE
33 DH
34 UICC
41, 41L P2P APPLICATION
42, 42L T3T APPLICATION
101 PACKET RECEPTION PROCESSING UNIT
102 ROUTING STATE MANAGEMENT UNIT
103 PRIORITY MANAGEMENT UNIT
104 WIRELESS COMMUNICATION CONTROL UNIT
200 COMPUTER
201 CPU

The invention claimed is:

1. A communication device comprising:
a plurality of targets physically located within the communication device and including at least one of a secure element (SE), a universal integrated circuit card (UICC) or an application of P2P (Peer to Peer); and
a front end which selects a candidate of a final target to be a communication target of an external device from the plurality of targets, in response to a command for selecting the candidate of the final target received from the external device, and performs near field communication (NFC) with the external device,
wherein the front end performs broadcast transmission of the command to the plurality of targets, in response to the command being received from the external device.

2. The communication device according to claim 1,
wherein the front end
selects the candidate of the final target by setting the application of P2P as a target having the highest priority in the selection of the candidate of the final target, and
selects the candidate of the final target as the final target, based on a second command from the external device including identification information of a predetermined target.

3. The communication device according to claim 2,
wherein the front end lowers the priority of the application of P2P in the selection of the candidate of the final target, in a case where the application of P2P is selected as the candidate of the final target and the application of P2P is not selected as the final target.

4. The communication device according to claim 2,
wherein the front end changes the priority of the application of P2P to the next place of priority of one or both of the SE and the UICC.

5. The communication device according to claim 2,
wherein the front end changes the priority so that a higher priority is assigned in the order of the SE, the UICC, and the application of P2P.

6. The communication device according to claim 2,
wherein the front end changes priority so that a higher priority is assigned in the order of the SE, the application of P2P, and the UICC.

7. The communication device according to claim 2,
wherein other targets of the plurality of targets excluding the application of P2P include a predetermined application based on a predetermined standard, and
the front end changes the priority so that a higher priority is assigned in the order of the SE, the UICC, the predetermined application, and the application of P2P.

8. The communication device according to claim 2,
wherein the front end changes the priority of the application of P2P to be the lowest priority.

9. The communication device according to claim 2,
wherein the front end changes the priority according to an operation sequence of the external device.

10. The communication device according to claim 2,
wherein, in a case where the priority of the application of P2P is changed and a predetermined period of time which is set in advance has elapsed, the front end returns the priority of the application of P2P to be the highest priority.

11. The communication device according to claim 2,
wherein the front end selects the candidate of the final target as the final target, when the identification information included in a second command from the external device and identification information of the candidate of the final target coincide with each other.

12. The communication device according to claim 1, wherein the front end deselects the final target from the communication target of the external device, based on predetermined target deselecting conditions.

13. The communication device according to claim 12, wherein, in a case a response to the broadcast transmission of the command is replied from any target, the front end deselects the final target from the communication target of the external device.

14. The communication device of claim 1, wherein the external device is an NFC reader.

15. A control method of a communication device which includes a plurality of targets physically located within the communication device and a front end, in which the plurality of targets includes at least one of a secure element (SE), a universal integrated circuit card (UICC) or an application of P2P (Peer to Peer) and a front end, the method comprising:
  causing the front end to select a candidate of a final target to be a communication target of an external device from the plurality of targets, in response to a command for selecting the candidate of the final target received from the external device;
  causing the front end to perform near field communication with the external device; and
  causing the front end to perform broadcast transmission of the command to the plurality of targets, in response to the command being received from the external device.

16. A non-transitory storage medium configured to store a program for controlling a communication device which includes a plurality of targets physically located within the communication device and a front end, in which the plurality of targets include at least one of a secure element (SE), a universal integrated circuit card (UICC) or an application of P2P (Peer to Peer), the program causing a computer of the communication device to execute processes of:
  causing the front end to select a candidate of a final target to be a communication target of an external device from the plurality of targets, in response to a command for selecting the candidate of the final target received from the external device;
  causing the front end to perform near field communication with the external device; and
  causing the front end to perform broadcast transmission of the command to the plurality of targets, in response to the command being received from the external device.

* * * * *